US012757079B2

(12) United States Patent
Hoole

(10) Patent No.: US 12,757,079 B2
(45) Date of Patent: Oct. 6, 2026

(54) WIRELESS CONNECTIVITY MANAGEMENT AND HANDOFF CONTROL

(71) Applicant: Charter Communications Operating, LLC, St. Louis, MO (US)

(72) Inventor: Elliott D. Hoole, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 586 days.

(21) Appl. No.: 18/211,847

(22) Filed: Jun. 20, 2023

(65) Prior Publication Data

US 2023/0337070 A1 Oct. 19, 2023

Related U.S. Application Data

(60) Division of application No. 17/900,182, filed on Aug. 31, 2022, now Pat. No. 11,770,745, which is a continuation of application No. 16/997,414, filed on Aug. 19, 2020, now Pat. No. 11,483,746.

(51) Int. Cl.

| | |
|---|---|
| ***H04W 36/00*** | (2009.01) |
| ***H04L 5/00*** | (2006.01) |
| ***H04W 12/062*** | (2021.01) |
| ***H04W 36/30*** | (2009.01) |
| ***H04W 36/32*** | (2009.01) |
| *H04W 36/08* | (2009.01) |

(52) U.S. Cl.

CPC ....... *H04W 36/0058* (2018.08); *H04L 5/0055* (2013.01); *H04W 12/062* (2021.01); *H04W 36/00837* (2018.08); *H04W 36/302* (2023.05); *H04W 36/324* (2023.05); *H04W 36/08* (2013.01)

(58) Field of Classification Search

None

See application file for complete search history.

(56) References Cited

U.S. PATENT DOCUMENTS

| | | | | |
|---|---|---|---|---|
| 2002/0147020 | A1 * | 10/2002 | Iguchi | H04W 28/20 455/452.2 |
| 2007/0249347 | A1 | 10/2007 | Saifullah et al. | |
| 2009/0197606 | A1 * | 8/2009 | Bergman | H04W 36/38 370/331 |
| 2013/0029668 | A1 | 1/2013 | Uchiyama et al. | |
| 2014/0031044 | A1 | 1/2014 | Mazzarella | |
| 2016/0302117 | A1 | 10/2016 | Inoue et al. | |
| 2018/0279193 | A1 | 9/2018 | Park et al. | |
| 2019/0174362 | A1 * | 6/2019 | Yang | H04W 36/00838 |

* cited by examiner

*Primary Examiner* — Suhail Khan

(74) *Attorney, Agent, or Firm* — Armis IP Law, LLC

(57) ABSTRACT

A communication management system (such as hardware and/or executed software) receives performance information indicating wireless connectivity performance between a communication device and a set of candidate wireless access points. The communication device is initially in communication with a first wireless access point over a wireless link. Based on the performance information, the communication management system selects a candidate wireless access point from the set in which to performance a handoff. The communication management hardware the notifies the communication device to handoff the wireless link from the first wireless access point to the selected candidate wireless access point.

25 Claims, 15 Drawing Sheets

WIRELESS CONNECTIVITY MANAGEMENT AND HANDOFF CONTROL

RELATED APPLICATION

This application is a divisional application of earlier filed U.S. patent application Ser. No. 17/900,182 entitled "WIRELESS CONNECTIVITY MANAGEMENT AND HANDOFF CONTROL," filed on Aug. 31, 2022, the entire teachings of which are incorporated herein by this reference.

U.S. patent application Ser. No. 17/900,182 is a continuation application of earlier filed U.S. patent application Ser. No. 16/997,414 entitled "WIRELESS CONNECTIVITY MANAGEMENT AND HANDOFF CONTROL," filed on Aug. 19, 2020, the entire teachings of which are incorporated herein by this reference.

BACKGROUND

In general, Wi-Fi™ is the name of a wireless standards group that decides implementations of the wireless Ethernet standards IEEE802.11. Such technology is defined by multiple different specifications from the Institute of Electrical and Electronics Engineers' (IEEE) 802.11 standards.

In a so-called Wi-Fi™ network, each of multiple communication devices (typically mobile) communicate with a wireless access point to access a remote network such as the Internet. In certain instances, each of the communication devices share the same one or more communication channels (same range of frequencies).

Wi-Fi™ is a contention based communication system as multiple communication devices compete to use the same wireless channel. For example, Wi-Fi™ uses a protocol called carrier sense multiple access with collision avoidance (CSMA/CA). In general, the communications include (1) listen before transmitting, (2) if a collision is detected by transmitting at the same time as another wireless station, wait a random time before trying to communicate again.

The devices compute random wait times to reduce collisions. For example, the wait time of a device is the number of idle time slots it must wait before transmitting, counted D seconds after then end of the previous transmission. The device must add D seconds to its wait time whenever that wait time is interrupted by a transmission.

Because devices compute different random wait times after a collision, they typically do not interfere with each other after attempting channel access again. If the channel is busy at the end of a wait time, the device computes a new random wait time and starts waiting again before transmitting.

Unlike cellular telecommunication technologies however, Wi-Fi™ does not have any specified handoff intelligence or protocols. This is because Wi-Fi™ generally is not designed to be or meant to be a mobility technology.

BRIEF DESCRIPTION OF EMBODIMENTS

Embodiments herein include supporting handoffs in a wireless network environment to ensure continuous wireless connectivity with a communication management system.

More specifically, a communication management resource (such as hardware, software, combination of hardware and software) controls connectivity of one or more communication devices in a network environment. For example, the communication management resource initially receives performance information indicating wireless connectivity performance between a first communication device and a set of one or more candidate wireless access points. Assume that the first communication device is in communication with a first wireless access point over a wireless link. Based on analysis of the performance information, the communication management resource selects a candidate wireless access point from the set. The communication management resource then notifies the communication device to handoff the wireless link from the first wireless access point to the selected candidate wireless access point.

In one embodiment, each of the first wireless access point and the selected candidate wireless access point provide the communication device connectivity to a controller resource (such as communication management hardware) that controls operation of the communication device. The handoff of the communication device from the first wireless access point to a second wireless access point ensures continued connectivity with the controller resource or a respective network.

Further embodiments herein include, via the controller (a.k.a., communication management hardware), communicating a first notification from a controller to the communication device. The first notification indicates a decision to handoff the wireless link from the first wireless access point to the second wireless access point. Additionally, in accordance with further example embodiments, the controller communicates a second notification from the controller to the communication device. The second notification indicates results of pre-authenticating the communication device with the selected wireless access point.

In still further example embodiments, prior to communicating the second notification of pre-authentication results or other information to the communication device, the controller communicates an authentication request from the controller to the selected wireless access point, the authentication request pre-authenticating the communication device with the selected wireless access point. In response to communicating the authentication request to the wireless access point, the controller receives an authentication response from the selected wireless access point.

In one embodiment, a further response from the controller to the communication device includes security information (such as results of pre-authenticating the communication device with the selected wireless access point) facilitating secured connectivity of the communication device with the selected wireless access point.

Further embodiments herein include, via the controller, communicating an identity of the selected wireless access point to the communication device. Accordingly, the communication device is informed of the selected wireless access point in which to perform a handoff of the wireless link. As a response to communicating the identity of the selected wireless access point to the communication device, the controller receives an acknowledgement message from the communication device. In one embodiment, the acknowledgement message from the communication device confirms an operation of the communication device initiating the handoff from the first wireless access point to the selected candidate wireless access point.

In still further example embodiments, the handoff notification (a command) to the communication device to handoff the wireless link from the first wireless access point to the selected candidate wireless access point causes a so-called FT or fast transfer (such as in accordance with standard 802.11 or a Wi-Fi™ protocol) of the communication device from the first wireless access point to the selected candidate wireless access point.

Still further embodiments herein include, via the controller, receiving an acknowledgement message from the communication device. In one embodiment, the acknowledgement is a response to the controller notifying the communication device to handoff the wireless link from the first wireless access point to the selected wireless access point. In one embodiment, the acknowledgement message confirms that the communication device has received the handoff message indicating/including the instruction to handoff the communication link from the first wireless access point to the selected candidate wireless access point.

Note that the performance information can be any suitable information. In one embodiment, the controller receives first performance information originating from the communication device; the first performance information indicates performance of the communication device receiving first wireless communication from the first wireless access point. The controller receives second performance information originating from the first wireless access point; the second performance information indicates performance of the first wireless access point receiving second wireless communications from the communication device. The controller receives third performance information originating from the candidate wireless access point; the third performance information indicates performance of the candidate wireless access point receiving third wireless communications from the communication device.

Still further embodiments herein include, via the controller, notifying a first communication device to handoff the wireless link from the first wireless access point to the selected candidate wireless access point in response to a second communication device blocking wireless signals between the first communication device and the first wireless access point.

Additionally, or alternatively, the controller monitors anticipated motion of a second communication device along a path in a network environment. In one embodiment, the controller notifies the first communication device to handoff the wireless link from the first wireless access point to the selected candidate wireless access point in response to detecting the anticipated motion of the second communication device blocking wireless signals between the first communication device and the first wireless access point at a particular time.

In yet further example embodiments, wireless 802.11 LAN (Local Area Network) systems as described herein provide network connectivity for client stations from one or more access points to which the clients are registered. If a client station moves from the coverage zone of a first wireless access point in the network and detects the signal from another wireless access point in the same network, then the client station can initiate a handoff of a respective connection from the first wireless access point to the second wireless access point. According to certain embodiments herein, this is known as reassociation and usually takes on the order of a few seconds to occur once the client station has made the decision to switch access points.

At higher frequencies (e.g. 60 GHz), the access point coverage zones become typically smaller due to the RF (Radio Frequency) propagation characteristics. In such an instance, faster moving client stations (such as mobile robots or other type of device) not only spend less time in each access point zone, the few seconds it takes to re-associate itself to the new wireless access point can severely impact the quality of service received by the client station.

Additionally, it should be noted that moving objects present in a wireless LAN deployment environment can block the signal path of stationary clients (communication devices) and impact their qualities of service as well. In general, the conventional wireless protocol 802.11r defines a fast transition (a.k.a., FT) functionality that reduces the amount of time for the client station to switch from handing off from one access point to another. A limitation of this FT amendment is that the decision to make the transition is based solely on the client station. In a typical Industrial Automation deployment scenario, there will be a multi-edge compute (MEC) system that will be required for enabling many of the target use cases. In general, Multi-access Edge Computing (MEC), is an ETSI-defined network architecture concept that enables cloud computing capabilities and an IT (Internet Technology) service environment at the edge of the cellular network and, more generally at the edge of any network. The enhanced MEC system as described herein is deployed to help facilitate reassociations of mobile clients as well as stationary clients that require a very high quality of service. This can be done with additional application software in the access points and the client stations and can make use of existing 802.11 messages and mechanisms.

These and additional embodiments are further discussed below.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiments herein include a computer readable storage medium and/or system having instructions stored thereon. The instructions, when executed by computer processor hardware, cause the computer processor hardware (such as one or more co-located or disparately processor devices) to: receive performance information indicating wireless connectivity performance between a communication device and a set of candidate wireless access points, the communication device being in communication with a first wireless access point over a wireless link; based on the performance information, select a candidate wireless access point from the set; and notify the communication device to handoff the wireless link from the first wireless access point to the selected candidate wireless access point.

Another one or more embodiments herein include a computer readable storage medium and/or system having instructions stored thereon. The instructions, when executed by computer processor hardware, cause the computer processor hardware (such as one or more co-located or disparately processor devices) to: communicate performance information through a first wireless access point over a wireless communication link to a controller, the performance information indicating wireless connectivity performance between the communication device and a second wireless access point in a network environment; receive control information from the controller, the control information indicating to handoff the wireless link from the first wireless access point to the second wireless access point; and in response to receiving the control information, initiate the handoff of the wireless link from the first wireless access point to the second wireless access point.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

Techniques as described herein are well suited for use in the field of supporting connectivity of multiple communication devices with wireless access points. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
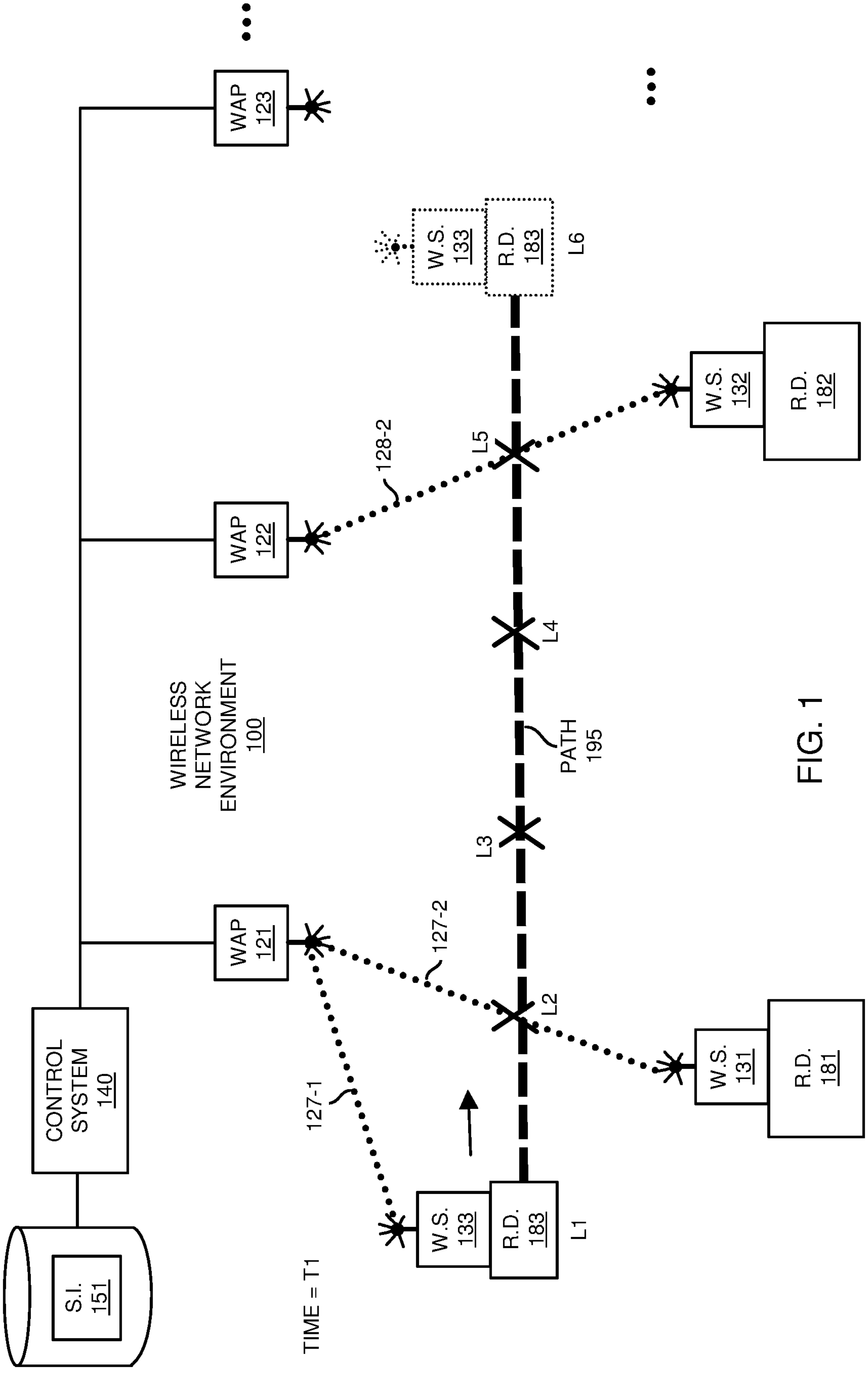
FIG. 1 is an example diagram illustrating connectivity of communication devices to respective wireless access points in a network environment according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to one embodiment, a communication management system (such as hardware and/or executed software) receives performance information indicating wireless connectivity performance between a communication device and a set of candidate wireless access points. The communication device is in communication with a first wireless access point over a wireless link. Based on the performance information, the communication management system selects a candidate wireless access point from the set in which to perform a handoff. The communication management hardware notifies the communication device to handoff the wireless link from the first wireless access point to the selected candidate wireless access point.

Overview

As more specifically discussed herein, wireless LAN (Local Area Network) systems (such as based on 802.11 or other wireless communication protocol) provide network connectivity for client stations from one or more wireless access points to which the clients are registered. If a client station moves from the coverage zone of a first access point in the network and detects the signal from a second access point in the same network, the client station has an ability to change its wireless connection from the first access point to the second access point. This is known as reassociation and usually takes on the order of a few seconds to occur once the client station has made the decision to switch access points.

At higher frequencies (e.g., such as greater than 10 GHz or around 60 GHz) the access point coverage zones in a wireless network become typically smaller due to the RF propagation/attenuation characteristics at such high frequencies. This disclosure includes the observation that, at higher frequencies, faster moving client stations, such as mobile robots, not only spend less time in each access point zone, the few seconds it takes to re-associate to the new access point can severely impact the quality of service received by the client station. Additionally, it is noted that moving objects in a wireless LAN deployment environment can block the signal path of stationary clients and impact their qualities of service as well. See FIGS. 1-6 below and corresponding discussion for an illustration of these events.

Conventional 802.11r wireless communication protocol defines a fast transition (FT) functionality that reduces the amount of time for a client station to switch from handing off a wireless communication link from one access point to another. One limitation of this amendment is that the decision to make a transition is based solely on the client station. In a typical Industrial Automation deployment scenario there will be a multi-edge compute (MEC) system (control system) that will be required for enabling many of the target use cases. This MEC system can therefore be employed to help facilitate reassociations of mobile clients as well as stationary clients that require a very high quality of service. As described herein, this can be implemented via additional application software in the access points and the client stations and can make use of existing 802.11 messages and mechanisms.

Entity Roles and Functions

Embodiments herein include wireless access points, client stations (such as wireless stations), and a MEC system (a.k.a., a control system).

A. Access Points (APs)

In one embodiment, the access points communicate in accordance with a wireless communication protocol such as 802.11 and perform the standard 802.11 MAC and Phy processing with the following application level enhancements such as:

- measure connected client station uplink (UL) performance metrics (RSSI, SNR, etc.)
- send metrics reports periodically to MEC.

B. Client Stations (STAs)

Similar to the wireless access points, the wireless stations (such as remote devices or stations) perform the standard communication processing such as via 802.11 MAC and Phy with the following application level enhancements:

- the wireless stations scan surrounding APs and record metrics—This could be from an assigned list which may include a subset of APs and could be dynamic list could be provided by MEC and could change depending on STATION location
- the wireless stations report AP metrics to MEC (RSSI, SNR, etc.) periodically (period could be provisioned by the control system)
- Perform FT sequence normally under direction from MEC
  - If the monitoring STA detects a radio link failure (RLF) or poor performance, then it needs to do FT autonomously:
    - i) Report FT to MEC upon success,
    - ii) Attempt FTs in order of metrics in scan list
      - Start with "best" candidate
        - If failure then attempt "next best" candidate and work down the list
      - Metrics and thresholds can be provisioned by MEC
      - If all candidates in list fail then fall back to standard 802.11 connection mechanisms C. MEC System The multi-edge compute (MEC) system is typically a compute cluster located near a local area network (LAN) and performs time-sensitive compute processing for devices connected to the LAN. In one embodiment, the MEC system includes an application running on the MEC platform in either a virtualized machine (VM) or computer that performs the following functions:

- Collect reports from wireless access points and wireless stations
- Monitor status and quality of all radio links between access points and stations
  - This could employ traditional algorithms or machine learning (ML) techniques
- Proactively issue FT commands to STAs to trigger the FT procedure to a selected target AP
- Update link status upon successful FT
- Operate as a proxy for STAs to expedite the FT process
  - Possibly use Broadcast and/or Multicast messages in RLF scenarios Now, more specifically, FIG. 1 is an example diagram illustrating connectivity of communication devices to respective wireless access points in a network environment according to embodiments herein.

In this example embodiment, the network environment 100 includes control system 140 (such as a MEC as previously discussed or other suitable entity), multiple wireless access points (such as wireless access point 121, wireless access points 122, wireless access point 123, etc.), and multiple wireless stations (wireless station 131, wireless station 132, wireless station 133, etc.).

As further shown, the network environment 100 includes multiple remote devices. For example, network environment 100 includes remote device 181, remote device 182, remote device 183, etc.

In one embodiment, the control system 140 controls movement and/or operation of the respective remote devices via commands wirelessly communicated to the respective remote devices. Additionally, or alternatively, the remote devices operate in an autonomous manner. In accordance with further example embodiments, the remote devices operate in a hybrid manner in which one or more of the remote devices receives commands from the control system 140 and operates in an autonomous manner to execute the received commands.

As further shown in this example embodiment, at time T1, the wireless station 131 provides the remote device 181 at location L7 connectivity to the control system 140 via the wireless communication link 127-2 between the wireless station 131 and the wireless access point 121; the wireless station 132 provides the remote device 182 at location L8 connectivity to the control system 140 via the wireless communication link 128-2 between the wireless station 132 and the wireless access point 122; the wireless station 133 provides the remote device 183 initially at location L1 connectivity to the control system 140 via the wireless communication link 127-1 between the wireless station 133 and the wireless access point 121; and so on.

As previously discussed, the wireless communication links support wireless communications between the remote devices and the control system 140. Communications over the wireless communication links can include commands, feedback, status information, etc.

As further shown in this example embodiment, the remote device 183 travels along the path 195 from location L1 to location L6, passing through locations L2, L3, L4, and L5 along the way. As further discussed below, movement of the remote device 183 along the path 195 at least temporarily disrupts (such as blocks) wireless communications between the wireless stations and respective wireless access points.

In one embodiment, the wireless stations and respective wireless access points communicate with each other via a wireless communication protocol spectrum access system Wi-Fi™ (such as based on 802.11 standards). In such an instance, the communication devices (such as wireless stations and wireless access points) compete to use the same wireless channel. For example, the communication devices implement a protocol called carrier sense multiple access with collision avoidance (CSMA/CA). In general, the communications include (1) listen before transmitting, (2) if a collision is detected by transmitting at the same time as another wireless station, wait a random time before trying to communicate again.

Figure 2:
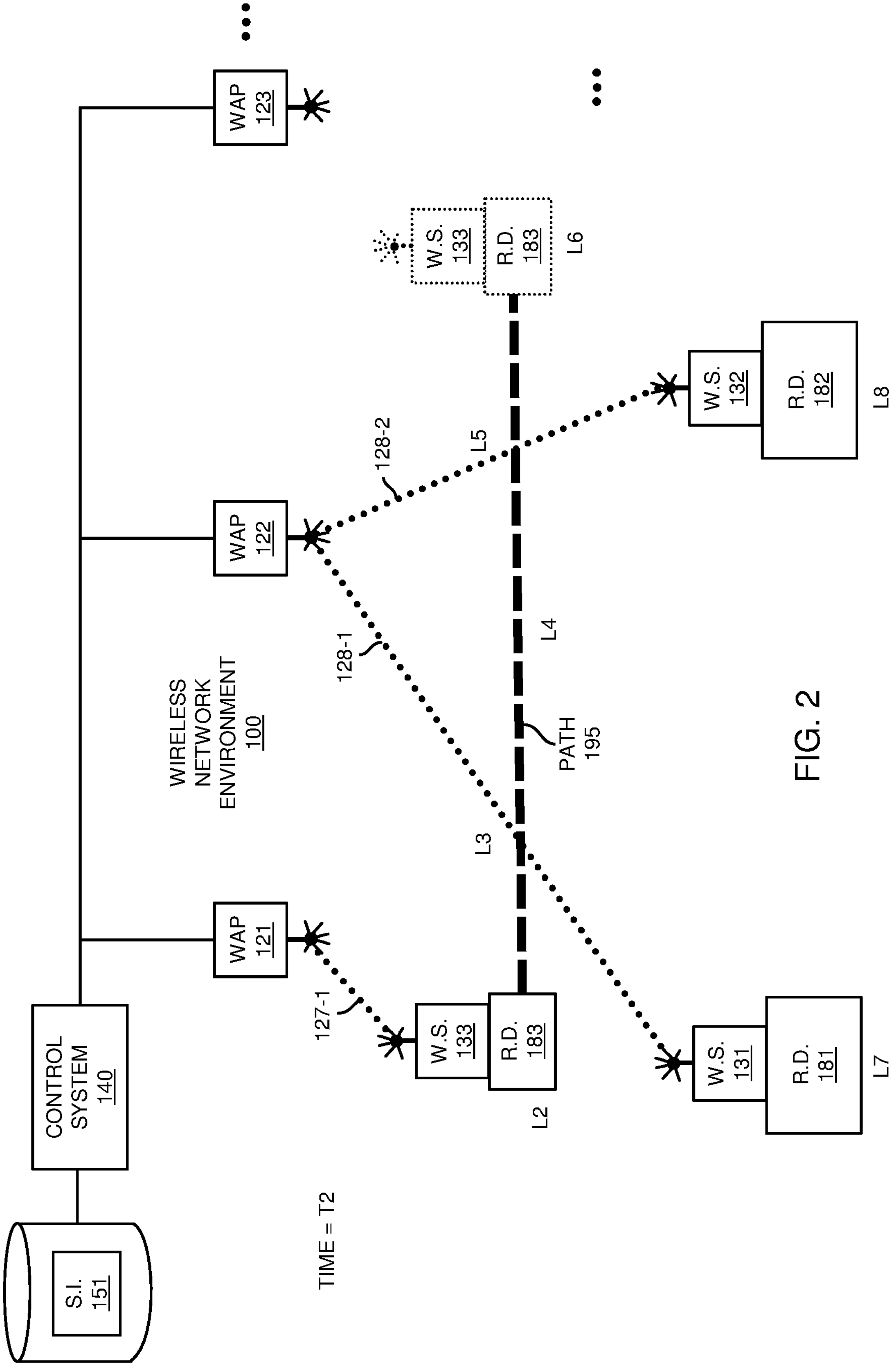
FIG. 2 is an example diagram illustrating connectivity of multiple communication devices with respective wireless access points in a network environment according to embodiments herein.

FIG. 2 is an example diagram illustrating connectivity of multiple communication devices with respective wireless access points in a network environment according to embodiments herein.

As further shown in this example embodiment, at time T2, in response to detecting a condition such as blocking or anticipated blocking of wireless communications between the wireless station 131 and the wireless access point 121 when the remote device 183 is at location L2, the wireless station 131 initiates a handoff of the wireless communication link 127-2 with the wireless access point 121 in FIG. 1 to the wireless communication link 128-1 with the wireless access point 122 in FIG. 2.

Thus, after the handoff of the wireless station 131 from the wireless access point 121 to the wireless access point 122 at or around time T2, the wireless station 131 provides the remote device 181 at location L7 connectivity to the control system 140 via the wireless communication link 128-1 between the wireless station 131 and the wireless access point 122; the wireless station 132 provides the remote device 182 at location L8 connectivity to the control system 140 via the wireless communication link 128-2 between the wireless station 132 and the wireless access point 122; the wireless station 133 provides the remote device 183 at location L2 connectivity to the control system 140 via the wireless communication link 127-1 between the wireless station 133 and the wireless access point 121; and so on.

Figure 3:
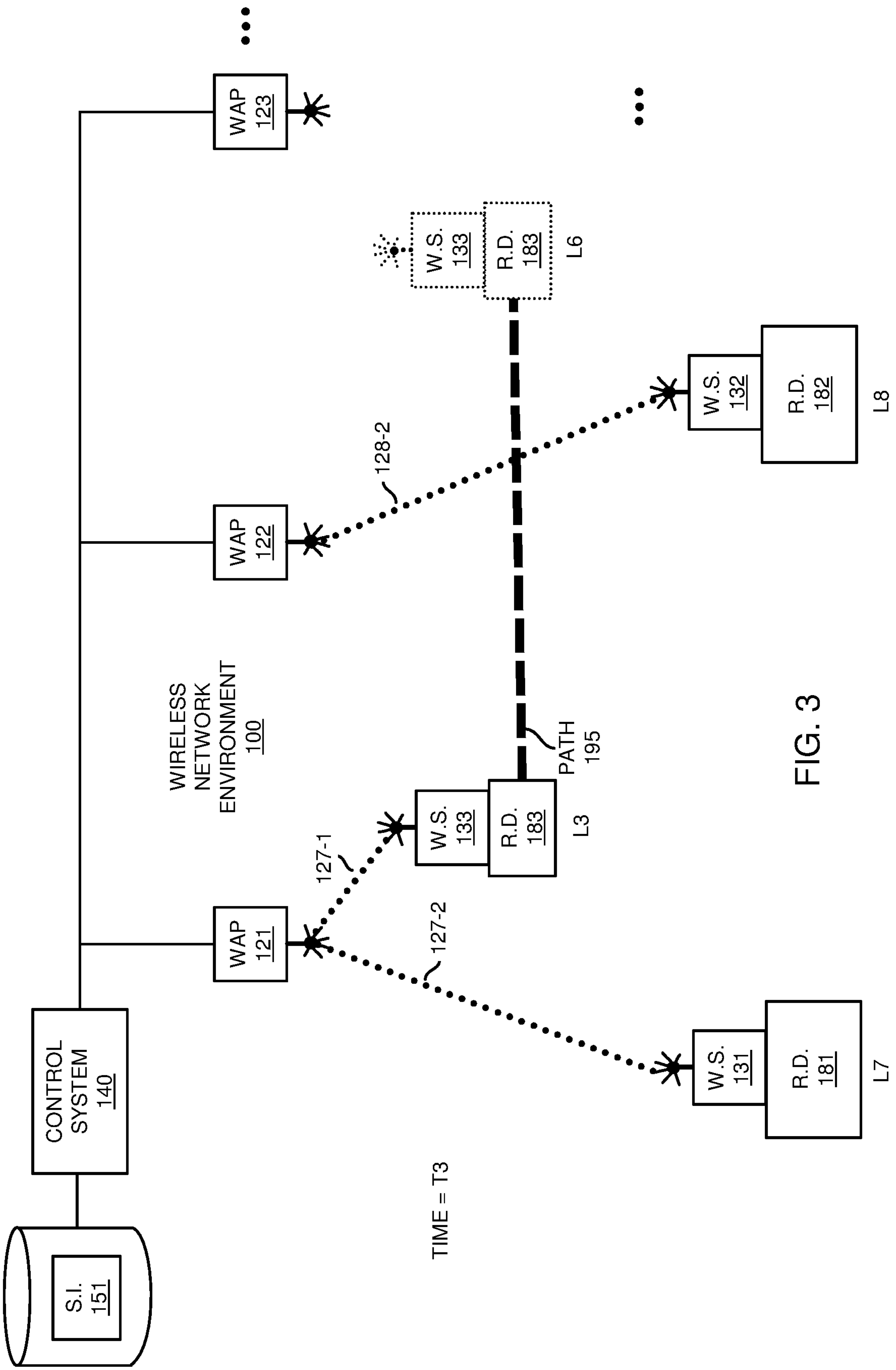
FIG. 3 is an example diagram illustrating handoff of a wireless link from a first wireless access point to a second wireless access point based on movement of a remote device according to embodiments herein.

FIG. 3 is an example diagram illustrating handoff of a wireless link from a first wireless access point to a second wireless access point based on movement of a remote device according to embodiments herein.

As further shown in this example embodiment, at or around time T3, in response to detecting a condition such as blocking or anticipated blocking of wireless communications between the wireless station 131 and the wireless access point 122 when the remote device 183 is at location L3, the wireless station 131 initiates a handoff of the wireless communication link 128-1 with the wireless access point 122 in FIG. 2 to the wireless communication link 127-2 with the wireless access point 121 in FIG. 3.

Thus, after the handoff of the wireless station 131 from the wireless access point 122 back to the wireless access point 121 at or around time T3, the wireless station 131 provides the remote device 181 at location L7 connectivity to the control system 140 via the wireless communication link 127-2 between the wireless station 131 and the wireless access point 121; the wireless station 132 provides the remote device 182 at location L8 connectivity to the control system 140 via the wireless communication link 128-2 between the wireless station 132 and the wireless access point 122; the wireless station 133 provides the remote device 183 at location L3 connectivity to the control system 140 via the wireless communication link 127-1 between the wireless station 133 and the wireless access point 121; and so on.

Figure 4:
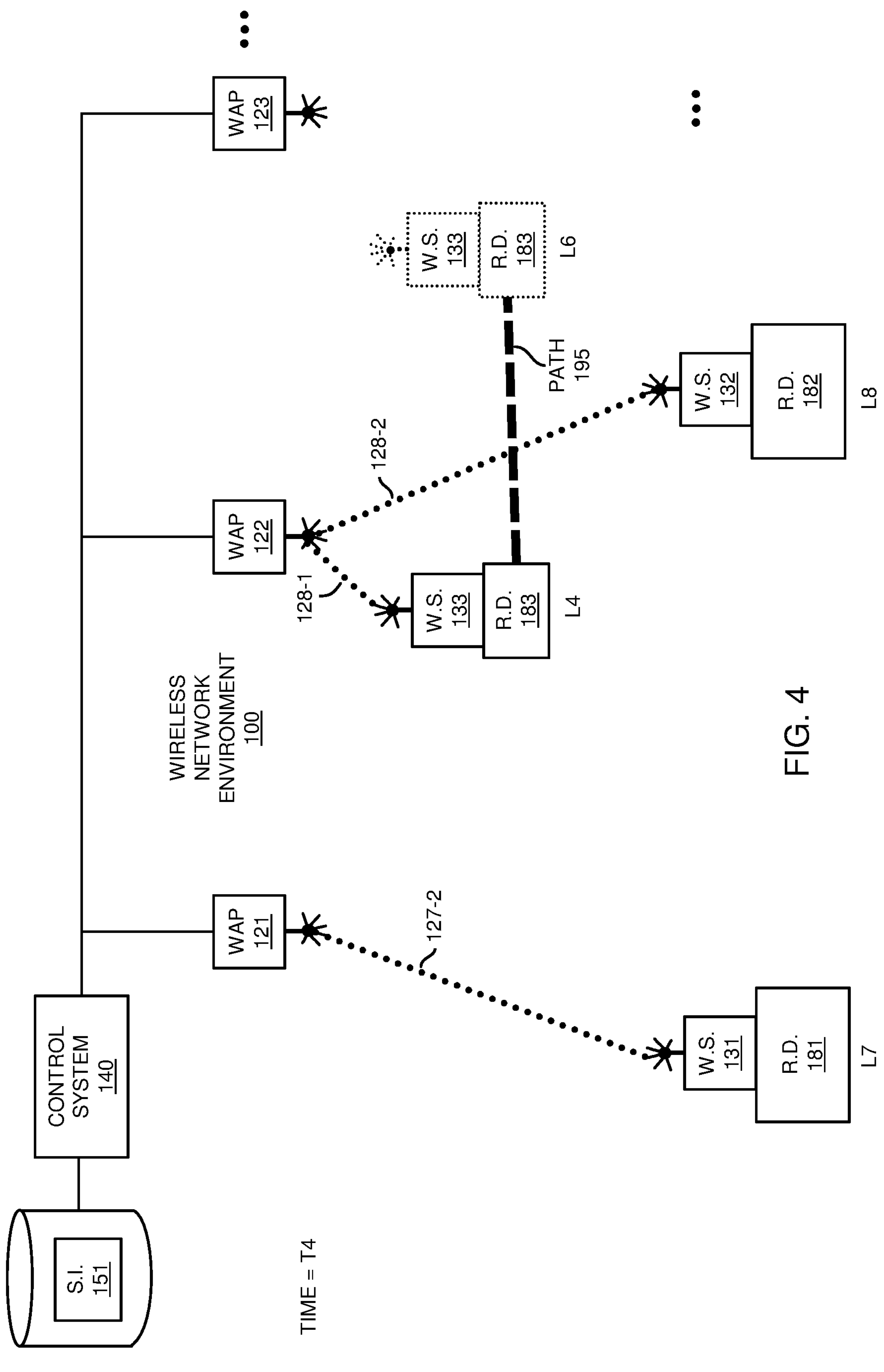
FIG. 4 is an example diagram illustrating connectivity of multiple communication devices with respective wireless access points in a network environment according to embodiments herein.

FIG. 4 is an example diagram illustrating connectivity of multiple communication devices with respective wireless access points in a network environment according to embodiments herein.

As further shown in this example embodiment, at or around time T4, in response to detecting a condition such as that the wireless access point 122 is able to provide a better wireless communication link with the wireless station 133 than the wireless access point 121 when the remote device 183 is at location L4, the wireless station 133 initiates a handoff of the wireless communication link 127-1 with the wireless access point 121 in FIG. 3 to the wireless communication link 128-1 with the wireless access point 122 in FIG. 4.

Thus, after the handoff of the wireless station 133 from the wireless access point 121 to the wireless access point 122 at or around time T4, the wireless station 131 provides the remote device 181 at location L7 connectivity to the control system 140 via the wireless communication link 127-2 between the wireless station 131 and the wireless access point 121; the wireless station 132 provides the remote device 182 at location L8 connectivity to the control system 140 via the wireless communication link 128-2 between the wireless station 132 and the wireless access point 122; the wireless station 133 provides the remote device 183 at location L4 connectivity to the control system 140 via the wireless communication link 128-1 between the wireless station 133 and the wireless access point 122; and so on.

Figure 5:
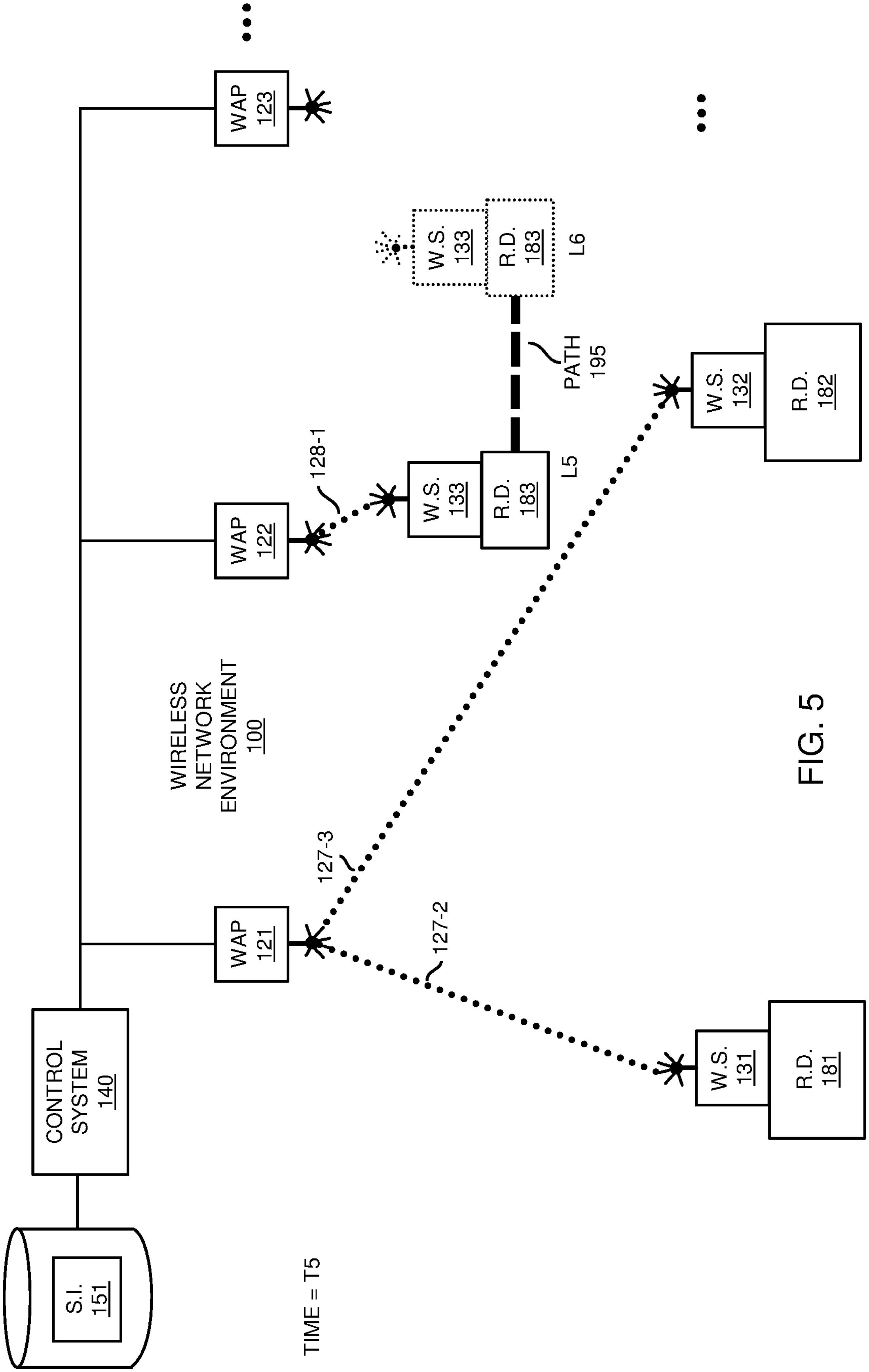
FIG. 5 is an example diagram illustrating handoff of multiple wireless links based on movement of a remote device according to embodiments herein.

FIG. 5 is an example diagram illustrating handoff of multiple wireless links based on movement of a remote device according to embodiments herein.

As further shown in this example embodiment, at or around time T5, in response to detecting a condition such as that the wireless access point 121 is able to provide a better wireless communication link with the wireless station 132 than the wireless access point 121 when the remote device 183 is at location L5, the wireless station 132 initiates a handoff of the wireless communication link 128-2 with the wireless access point 121 in FIG. 4 to the wireless communication link 127-3 with the wireless access point 121 in FIG. 5.

Thus, after the handoff of the wireless station 132 from the wireless access point 122 to the wireless access point 121 at or around time T5, the wireless station 131 provides the remote device 181 at location L7 connectivity to the control system 140 via the wireless communication link 127-2 between the wireless station 131 and the wireless access point 121; the wireless station 132 provides the remote device 182 at location L8 connectivity to the control system 140 via the wireless communication link 127-3 between the wireless station 132 and the wireless access point 121; the wireless station 133 provides the remote device 183 at location L5 connectivity to the control system 140 via the wireless communication link 128-1 between the wireless station 133 and the wireless access point 122; and so on.

Figure 6:
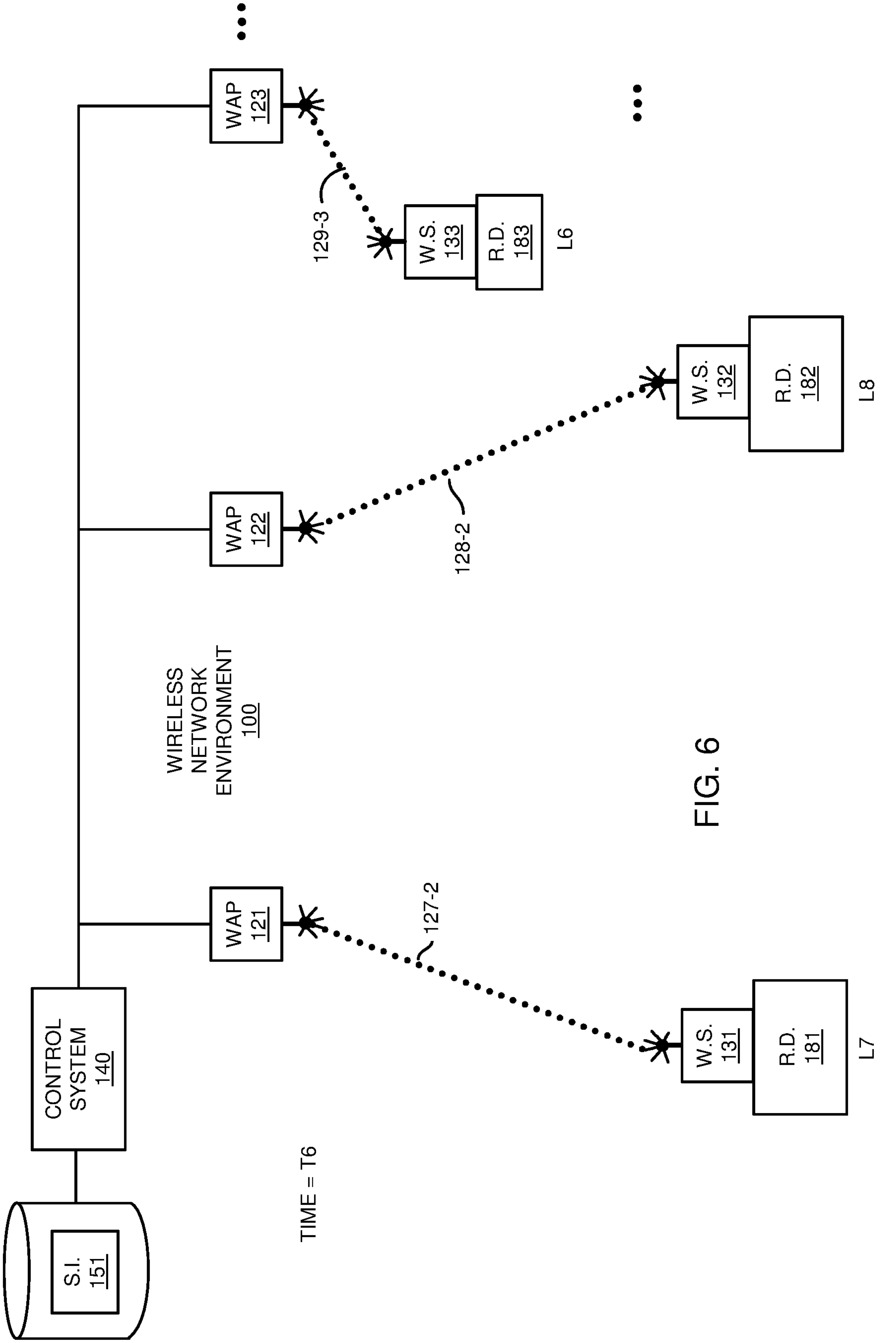
FIG. 6 is an example diagram illustrating connectivity of multiple communication devices with respective wireless access points in a network environment according to embodiments herein.

FIG. 6 is an example diagram illustrating connectivity of multiple communication devices with respective wireless access points in a network environment according to embodiments herein.

As further shown in this example embodiment, at or around time T6, in response to detecting a condition such as that the wireless access point 123 is able to provide a better wireless communication link with the wireless station 133 than the wireless access point 122 when the remote device 183 is at location L6, the wireless station 133 initiates a handoff of the wireless communication link 128-3 with the wireless access point 122 in FIG. 5 to the wireless communication link 129-3 with the wireless access point 123 in FIG. 6.

Thus, in response to detecting a condition such as that the wireless access point 122 is able to provide a better wireless communication link with the wireless station 132 than the wireless access point 121 when the remote device 183 is at location L6, the wireless station 132 initiates a handoff of the wireless communication link 127-3 with the wireless access point 121 in FIG. 5 to the wireless communication link 128-2 with the wireless access point 122 in FIG. 6.

Thus, after the handoff of the wireless station 133 from the wireless access point 122 to the wireless access point 123 at or around time T6, and handoff of the wireless station 132 from the wireless access point 121 to the wireless access point 122 at or around time T6, the wireless station 131 provides the remote device 181 at location L7 connectivity to the control system 140 via the wireless communication link 127-2 between the wireless station 131 and the wireless access point 121; the wireless station 132 provides the remote device 182 at location L8 connectivity to the control system 140 via the wireless communication link 128-2 between the wireless station 132 and the wireless access point 122; the wireless station 133 provides the remote device 183 at location L6 connectivity to the control system 140 via the wireless communication link 129-3 between the wireless station 133 and the wireless access point 122; and so on.

Thus, movement of the remote device 183 along the path 195 results in many handoffs in order to provide most efficient use of wireless bandwidth in the network environment 100. The handoffs maintain required levels of quality of service (QoS) for each of the endpoint devices.

Figure 7:
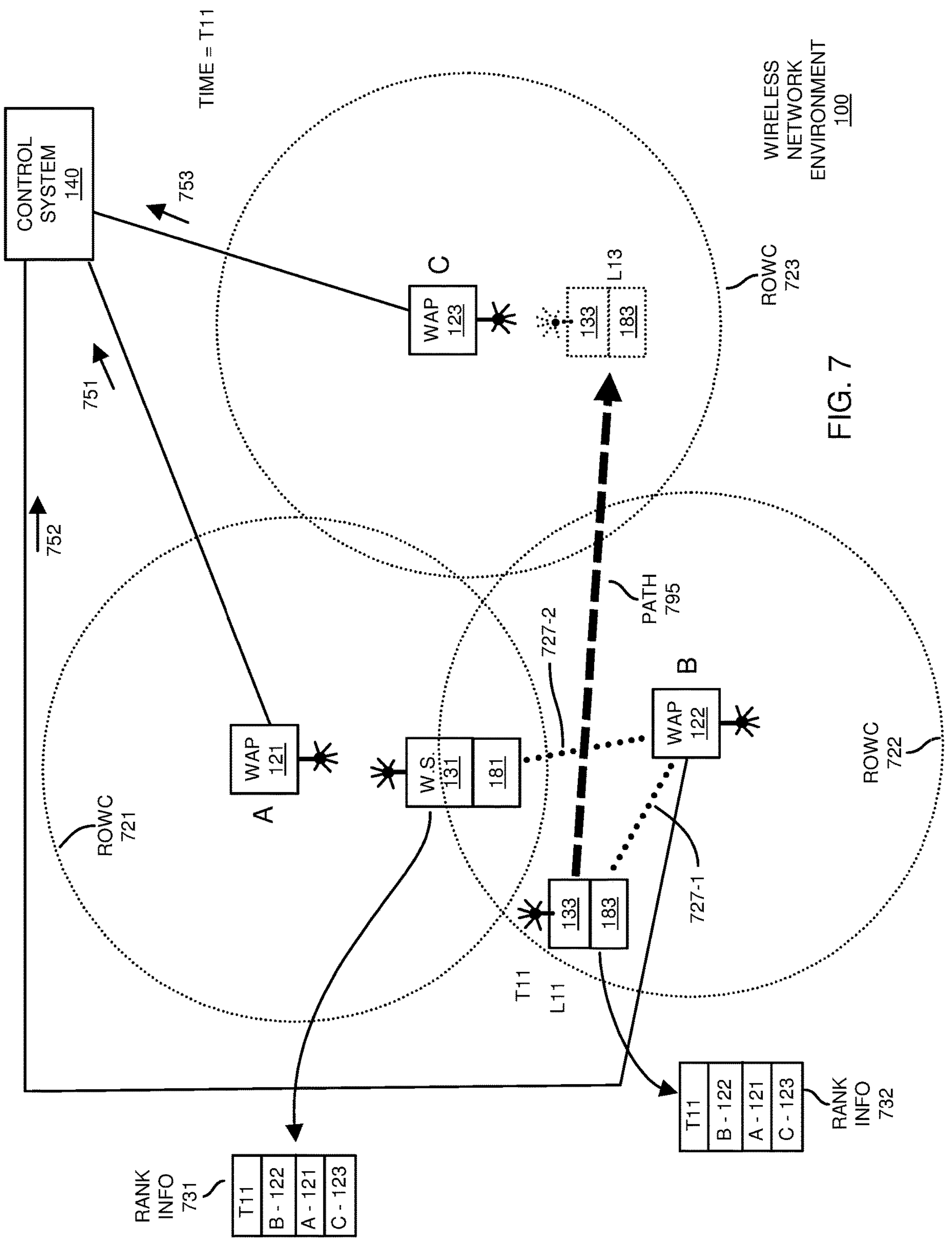
FIG. 7 is an example diagram illustrating ranking of wireless access points and wireless connectivity according to embodiments herein.

FIG. 7 is an example diagram illustrating ranking of wireless access points and wireless connectivity according to embodiments herein.

In this example embodiment, the wireless access point 121 provides wireless connectivity to wireless stations in a vicinity of region of wireless coverage 721; the wireless access point 122 provides wireless connectivity to wireless stations in a vicinity of region of wireless coverage 722; the wireless access point 123 provides wireless connectivity to wireless stations in a vicinity of region of wireless coverage 723; and so on.

At time T11, the remote device 183 and corresponding wireless station 133 reside at location L11 while traveling on path 795. The control system 140 receives performance information 751, 752, and 753.

As its name suggests, the performance information includes any suitable information indicating a performance of wireless connectivity between a wireless station and a wireless access point.

In one embodiment, the performance information 751 indicates a wireless signal strength of the wireless access point 121 receiving wireless communications from each of the wireless stations 131 and 133. The performance information 752 indicates a wireless signal strength of the wireless access point 122 receiving wireless communications from each of the wireless stations 131 and 133. The performance information 753 indicates a wireless signal strength of the wireless access point 123 receiving wireless communications from each of the wireless stations 131 and 133.

Note again that the performance information can include further information such as a received signal strength of the wireless stations receiving wireless communications from the wireless access points. For example, in one embodiment, performance information 752 includes information indicating signal strengths of the wireless station 131 receiving wireless communications from each of the wireless access points 121, 122, and 123. Performance information 752 can further include information indicating signal strengths of the wireless station 133 receives wireless communications from each of the wireless access points 121, 122, and 123.

In accordance with further example embodiments, based on the received performance information, the control system 140 or other suitable entity produces ranking information 731 assigned to wireless station 131 and ranking information 733 assigned to wireless station 133.

For example, for time T11, ranking information 731 ranks the wireless access point 122 as being the best candidate (highest in the list) to provide wireless connectivity to the wireless station 131; ranking information 731 ranks the wireless access point 121 as being the second best candidate (second highest in the list) to provide wireless connectivity to the wireless station 131; ranking information 731 ranks the wireless access point 123 as being the third best candidate to provide wireless connectivity to the wireless station 131; and so on.

For time T11, ranking information 733 ranks the wireless access point 122 as being the best candidate (highest in the list) to provide wireless connectivity to the wireless station 133; ranking information 731 ranks the wireless access point 121 as being the second best candidate (second highest in the list) to provide wireless connectivity to the wireless station 133; ranking information 731 ranks the wireless access point 123 as being the third best candidate to provide wireless connectivity to the wireless station 133; and so on.

In such an instance, based on ranking information 731, the control system 140 notifies or causes the wireless station 131 to connect to the wireless access point 122 via wireless communication link 727-2. Based on ranking information 733, the control system 140 notifies or causes the wireless station 133 to connect to the wireless access point 122 via wireless communication link 727-1.

Figure 8:
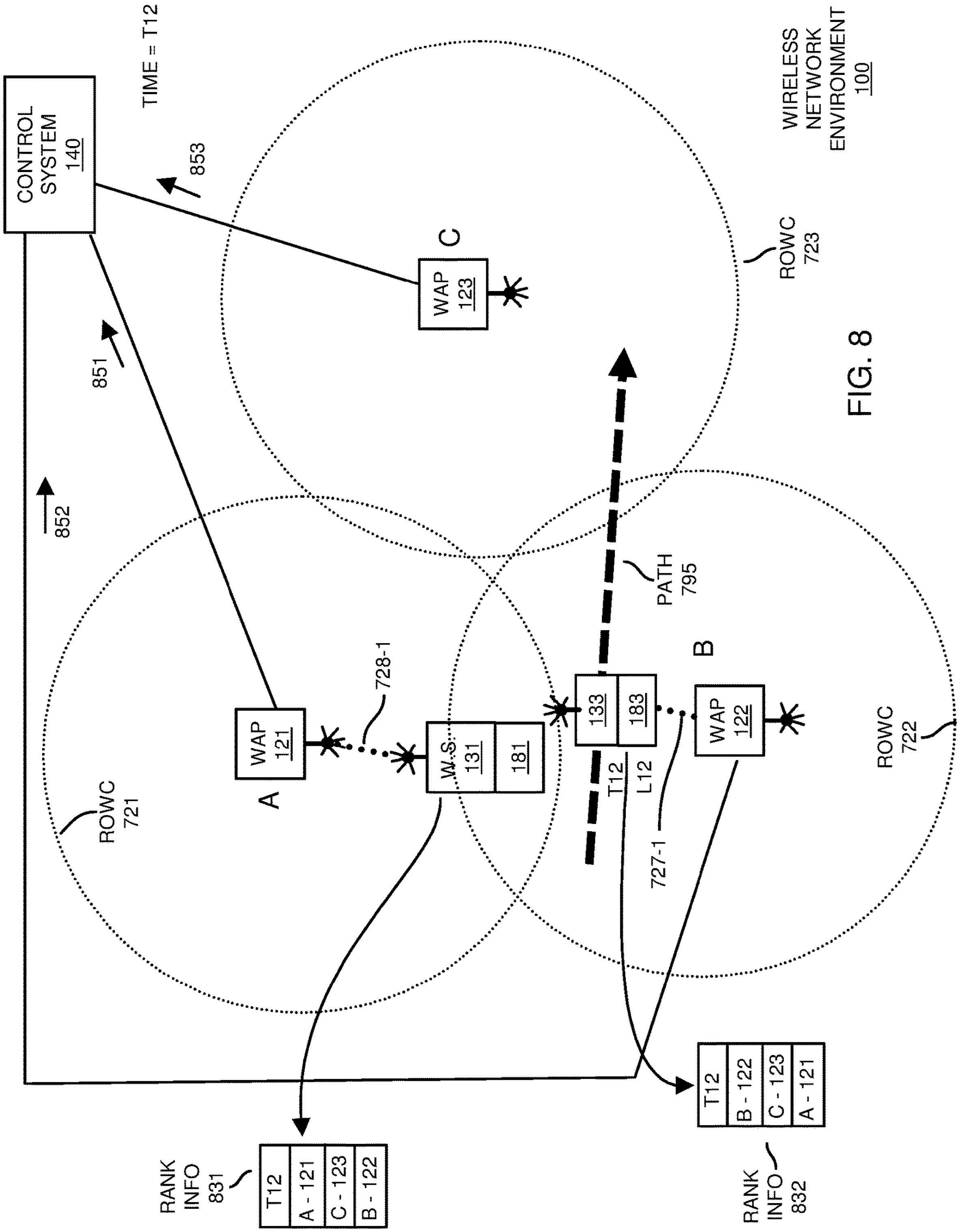
FIG. 8 is an example diagram illustrating ranking of wireless access points and wireless communication link handoffs according to embodiments herein.

FIG. 8 is an example diagram illustrating ranking of wireless access points and wireless communication link handoffs according to embodiments herein.

In this example embodiment, at time T12, the remote device 183 resides at location L12 while traveling on path 795. The control system 140 receives performance information 851, 852, and 853.

In one embodiment, based on previous connectivity in FIG. 7 before a handoff in FIG. 8, the performance information 851 indicates a wireless signal strength of the wireless access point 121 receiving wireless communications from each of the wireless stations 131 and 133. The performance information 852 indicates a wireless signal strength of the wireless access point 122 receiving wireless communications from each of the wireless stations 131 and 133. The performance information 853 indicates a wireless signal strength of the wireless access point 123 receiving wireless communications from each of the wireless stations 131 and 133.

Note that the performance information can include further information such as a received signal strength of the wireless stations receiving wireless communications from the wireless access points. For example, in one embodiment, performance information 852 includes information indicating signal strengths of the wireless station 133 receiving wireless communications from each of the wireless access points 121, 122, and 123. Performance information 852 further includes information indicating signal strengths of the wireless station 133 receives wireless communications from each of the wireless access points 121, 122, and 123.

In accordance with further example embodiments, based on the received performance information, the control system 140 produces ranking information 831 assigned to wireless station 131 and ranking information 833 assigned to wireless station 133 in FIG. 8.

For example, for time T12, ranking information 831 ranks the wireless access point 121 as being the best candidate (highest in the list) to provide wireless connectivity to the wireless station 131; ranking information 831 ranks the wireless access point 123 as being the second best candidate (second highest in the list) to provide wireless connectivity to the wireless station 131; ranking information 831 ranks the wireless access point 122 as being the third best candidate to provide wireless connectivity to the wireless station 131; and so on.

For time T12, ranking information 833 ranks the wireless access point 122 as being the best candidate (highest in the list) to provide wireless connectivity to the wireless station 133; ranking information 833 ranks the wireless access point 123 as being the second best candidate (second highest in the list) to provide wireless connectivity to the wireless station 133; ranking information 833 ranks the wireless access point 121 as being the third best candidate to provide wireless connectivity to the wireless station 133; and so on.

In such an instance, based on ranking information 831 in FIG. 8, the control system 140 notifies the wireless station 131 to connect to the wireless access point 121 via wireless communication link 728-1. Based on ranking information 833 in FIG. 8, the control system 140 notifies the wireless station 133 to connect to the wireless access point 122 via wireless communication link 727-1.

Figure 9:
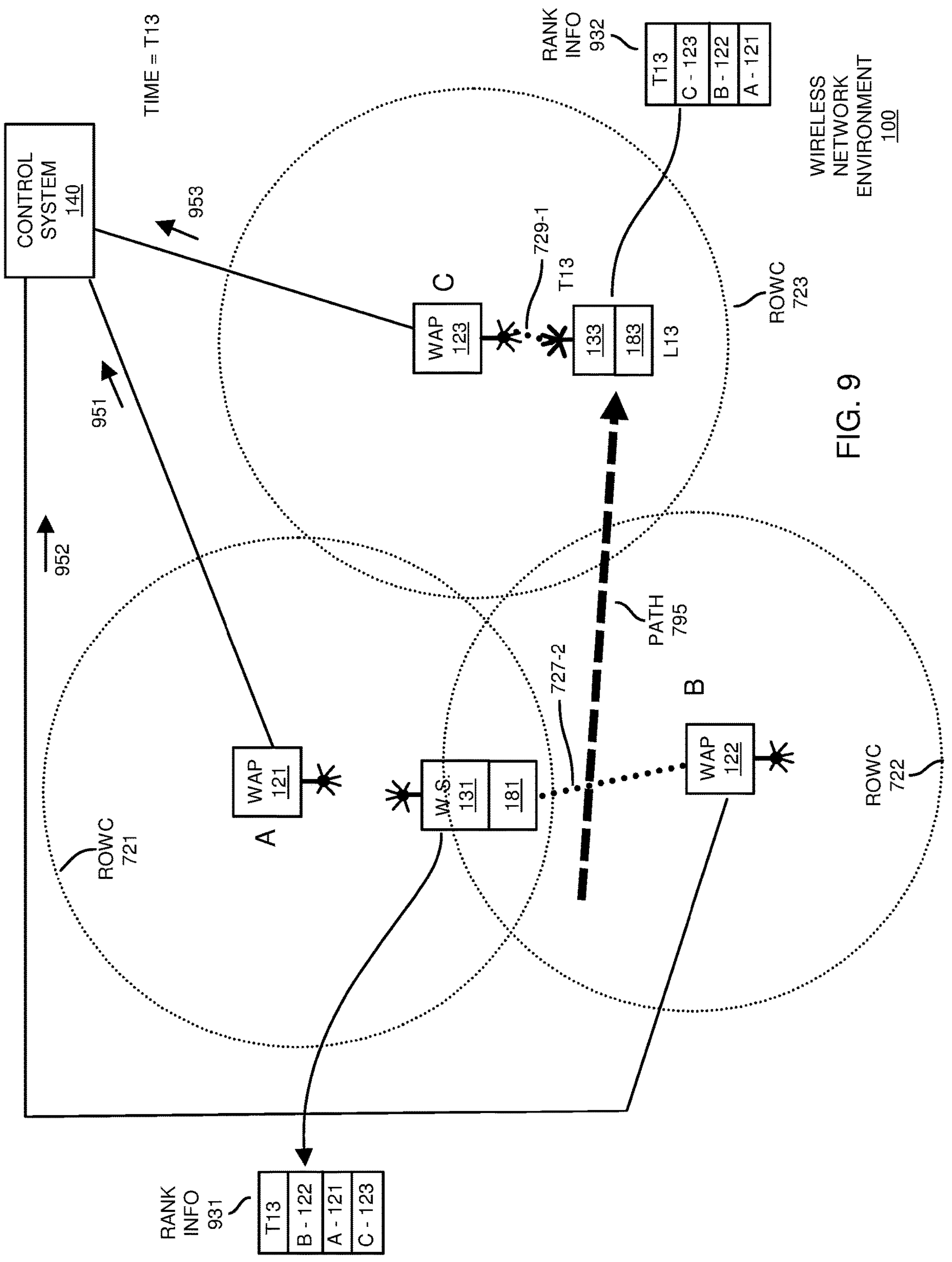
FIG. 9 is an example diagram illustrating ranking of wireless access points and wireless communication link handoffs according to embodiments herein.

FIG. 9 is an example diagram illustrating ranking of wireless access points and wireless communication link handoffs according to embodiments herein.

At time T13, the remote device 183 resides at location L13 while traveling on path 795. The control system 140 receives performance information 951, 952, and 953. In one embodiment, based on previous connectivity in FIG. 8 before a handoff in FIG. 9, the performance information 951 indicates a wireless signal strength of the wireless access point 121 receiving wireless communications from each of the wireless stations 131 and 132. The performance information 952 indicates a wireless signal strength of the wireless access point 122 receiving wireless communications from each of the wireless stations 131 and 132. The performance information 953 indicates a wireless signal strength of the wireless access point 123 receiving wireless communications from each of the wireless stations 131 and 132.

Note that the performance information can include further information such as a received signal strength of the wireless stations receiving wireless communications from the wireless access points. For example, in one embodiment, performance information 951 includes information indicating signal strengths of the wireless station 131 receiving wireless communications from each of the wireless access points 121, 122, and 123. Performance information 952 further includes information indicating signal strengths of the wireless station 133 receives wireless communications from each of the wireless access points 121, 122, and 123.

In accordance with further example embodiments, based on the received performance information in FIG. 9, the control system 140 produces ranking information 931 assigned to wireless station 131 and ranking information 933 assigned to wireless station 133.

For example, for time T13, ranking information 931 ranks the wireless access point 122 as being the best candidate (highest in the list) to provide wireless connectivity to the wireless station 131; ranking information 931 ranks the wireless access point 121 as being the second best candidate (second highest in the list) to provide wireless connectivity to the wireless station 131; ranking information 931 ranks the wireless access point 123 as being the third best candidate to provide wireless connectivity to the wireless station 131; and so on.

For time T13, ranking information 933 ranks the wireless access point 123 as being the best candidate (highest in the list) to provide wireless connectivity to the wireless station 133; ranking information 933 ranks the wireless access point 122 as being the second best candidate (second highest in the list) to provide wireless connectivity to the wireless station 133; ranking information 933 ranks the wireless access point 121 as being the third best candidate to provide wireless connectivity to the wireless station 133; and so on.

In such an instance, based on ranking information 931 in FIG. 9, the control system 140 notifies or causes the wireless station 131 to connect to the wireless access point 122 via wireless communication link 727-2. Based on ranking information 933, the control system 140 notifies or causes the wireless station 133 to connect to the wireless access point 122 via wireless communication link 729-1.

Figure 10:
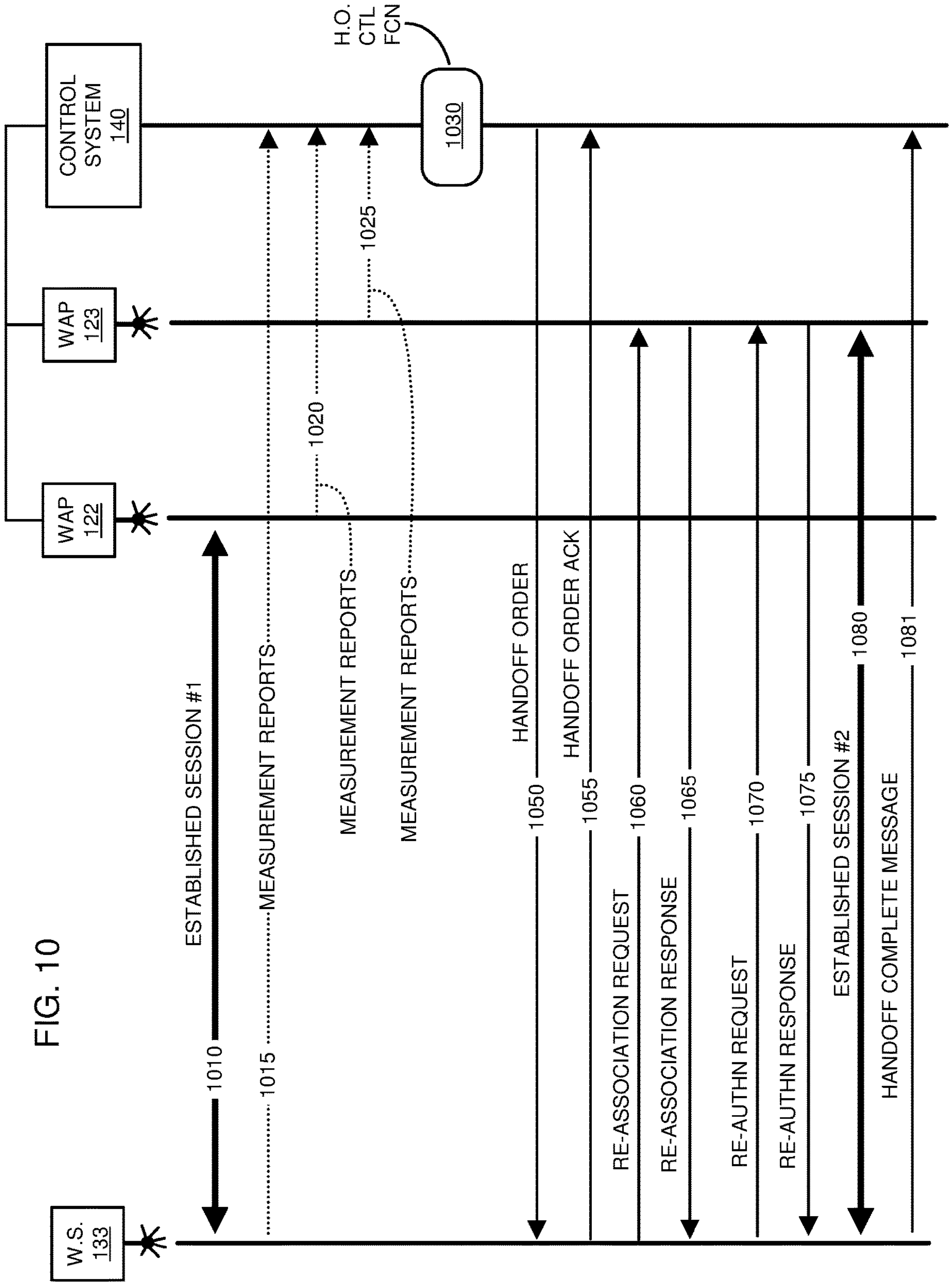
FIG. 10 is an example diagram illustrating a handoff technique according to FIG. 11 is an example diagram illustrating a handoff technique according to embodiments herein.

FIG. 10 is an example diagram illustrating a handoff technique according to embodiments herein.

In this example embodiment, the wireless station 13X (where X=1, 2, 3, etc.) is one of wireless station 131, wireless station 132, wireless station 133, etc., as previously discussed. The wireless station 13X may be mobile or stationary in the wireless network environment 100.

Further, as previously discussed, movement of a respective one or more wireless station in the wireless network environment 100 causes the current wireless link between the respective wireless station and a first wireless access point to degrade, causing the control system 140 to initiate a handoff of the respective wireless station 13X to a second wireless access point based on ranking information generated for the respective wireless station.

As further shown in this example embodiment, via communications 1010, the wireless station 133 is initially in communication with the wireless access point 122 via a respective established session #1 (such as wireless communication link). Thus, the communication device (wireless station 13X and corresponding remote device) is in communication with wireless access point 122 over a respective wireless link.

In a similar manner as previously discussed, the control system 140 (i.e., communication management resource) receives performance information indicating wireless connectivity performance between the wireless station and a set of candidate wireless access points including wireless access point 123.

More specifically, the wireless station 13X analyzes a power level or quality of wireless communications (such as downlink) received from the wireless access point 122; the wireless station 13X analyzes a power level or quality of wireless communications received from the wireless access point 122; and so on.

Via communications 1015, the wireless station 13X reports the performance information (such as power level of received wireless communications, link quality, etc.) regarding received wireless communications to the control system 140.

The wireless access point 122 analyzes a power level or quality of wireless communications received from the wireless station 13X in the uplink direction. Via communications 1020, the wireless access point 122 reports the performance information (such as power level of received wireless communications, link quality, etc., associated with wireless communications received from the wireless station 13X) to the control system 140.

The wireless access point 123 analyzes a power level or quality of wireless communications received from the wireless station 13X in the uplink direction. Via communications 1025, the wireless access point 123 reports the performance information (such as power level of received wireless communications, link quality, etc., associated with wireless communications received from the wireless station 13X) to the control system 140.

Thus, the control system 140 receives first performance information originating from the wireless station 13X; the first performance information indicates performance of the wireless station 13X receiving communications from the first wireless access point 122 and the wireless access point 123.

The control system 140 receives second performance information originating from the first wireless access point 122; the second performance information indicates performance of the first wireless access point 122 receiving second wireless communications from the wireless station 13X.

The control system 140 receives third performance information originating from the candidate wireless access point 123; the third performance information indicates performance of the candidate wireless access point 123 receiving third wireless communications from the wireless station 13X.

Based on analysis of the performance information via handoff control function 1030 associated with control system 140 or other suitable entity, the control system 140 selects a candidate wireless access point from the set of candidate wireless access points including wireless access points 122 and 123.

Assume in this example embodiment that the communication system 140 detects that the link quality between the wireless station 13X and wireless access point 122 is poor and that the wireless access point 123 would provide much better wireless connectivity. In such an instance, the handoff control function 1030 notifies the wireless station 13X and corresponding remote device to handoff its current wireless link from the wireless access point 122 to the selected candidate wireless access point 123.

As previously discussed, in one embodiment, each of the first wireless access point 122 and the selected candidate wireless access point 123 provide the wireless station 13X (communication device) connectivity to the control system 140 (such as a controller resource or communication management hardware) that controls operation and wireless connectivity of the remote device. The initiated handoff of the wireless station 13X from the first wireless access point 122 to the second wireless access point 123 ensures continued connectivity of the wireless station 13X to the control system 140 when the link between the while station 133 in the wireless access point 122 degrades.

As further shown in FIG. 10, via communications 1050, in response to making a respective decision to perform a handoff from the wireless access point 122 to the wireless access point 123, the control system 140 (a.k.a., communication management hardware) communicates a notification (handoff order or command message) from the control system 140 through wireless access point 122 to the wireless station 13X. The first notification indicates a decision to handoff the wireless link from the first wireless access point to the second wireless access point.

Further embodiments herein include, via the control system 140 and communications 1050, communicating an identity of the selected wireless access point 123 to the wireless station 13X. Accordingly, the wireless station 13X is informed of the selected wireless access point 123 in which to perform a handoff of a respective wireless link.

In one embodiment, as a response to communicating the identity of the selected wireless access point 123 and handoff command to the wireless station 13X the communications 1050, the control system 140 receives an acknowledgement message (via communications 1055) from the wireless station 13X through the wireless access point 122.

In one embodiment, the acknowledgement message as indicated by the communications 1055 (such as a Handoff Order Acknowledgment) confirms that the wireless station 13X has received the handoff message in communications 1050 indicating/including the instruction to handoff the communication link from the first wireless access point 122 to the selected candidate wireless access point 123. In one embodiment, the communications 1055 notify the control system that the wireless station 13X will initiate a respective handoff as indicated by the handoff command in communications 1050.

In yet further example embodiments, the handoff notification in communications 1050 to the wireless station 13X causes a so-called fast transfer (such as in accordance with standard 802.11 or a Wi-Fi™ protocol) of the wireless station 13X from the wireless access point 122 to the selected candidate wireless access point 123.

As previously discussed, a poor wireless communication link between the wireless station 13X and the wireless access point 122 can occur for any reason. In one embodiment, the control system 140 generates communications 1050 in response to detecting that a remote device or object in the wireless network environment 100 blocks wireless signals between the wireless station 13X and the wireless access point 122.

As previously discussed, determining that wireless connectivity is poor between the wireless station 13X and the wireless access point can be detected in any suitable manner. For example, in one embodiment, the control system 140 monitors anticipated motion of objects such as a second communication device along paths of network environment. In one embodiment, the control system 140 notifies the wireless station 13X to handoff a respective wireless link from the first wireless access point 122 to the selected candidate wireless access point 123 in response to detecting the anticipated motion of the second communication device blocking wireless signals between the wireless station 13X and the first wireless access point 122 at a particular time.

As further shown, in response to receiving the handoff command via communications 1050, the wireless station 13X sends a request in communications 1060 to the wireless access point 123 to establish a respective wireless link. In one embodiment, the communications 1060 include a re-association request.

In response to receiving the re-association request in communications 1060, the wireless access point 123 generates and transmits a respective association response in communications 1065 to the wireless station 13X.

In accordance with further example embodiments, the wireless station 13X performs authentication with the wireless access point 123 to establish a respective wireless communication link. For example, via communications 1070, the wireless station 13X transmits an authentication request to the wireless access point 123 to establish the handoff wireless communication link as a secured communication link. In response to receiving the authentication request, the wireless station 13X communicates an authentication response in communications 1075 to the wireless station 13X.

In one embodiment, the communications 1070 and 1075 include back-and-forth communications setting up encryption capability between the wireless station 13X and the wireless access point 123.

Via further communications 1080, after completion of the handoff, the wireless station 13X and the wireless access point 123 are able to communicate with each other over a respective secured wireless communication link via session #2.

In one embodiment, subsequent to establishing the new session #2 between the wireless station 133 and the wireless access point 123, the wireless station 13X communicates a handoff complete message (such as communication 1081) to the control system 140. The handoff complete message indicates completion of handing off of the wireless station 13X (or wireless station 133) from wireless access point 122 to wireless access point 123. The control system 140 keeps track of the new connectivity between the wireless station 133 and the wireless access point 123.

Summary of Methods and Procedures

A. MEC triggered Fast Transition (FT)

1. Access points (APs) and stations (STAs) each measure radio link metrics and send measurement reports to the control system 140 (such as MEC system).
2. The control system 140 monitors all of the radio link metrics and issues FT (Fast Transfer) trigger orders to those wireless stations that require them. This could be due to the wireless stations being mobile and moving from one AP coverage zone to another, or it could be due to moving objects within the deployment environment that have blocked the radio link and a new radio connection is required to maintain a particular quality of service (QoS)
3. The control system 140 issues an order to a wireless station to commence the FT (handoff) procedure to the wireless access point specified in the order message.
4. The wireless station receiving the handoff (FT) order message from the control system 140 acknowledges the order and then begins the standard FT procedure to the wireless access point given in the FT order message.
5. Upon completion of the standard FT message exchange with a respective target access point receiving the handoff, the wireless station receives service through a newly established session on the target access point receiving the handoff.

Figure 11:
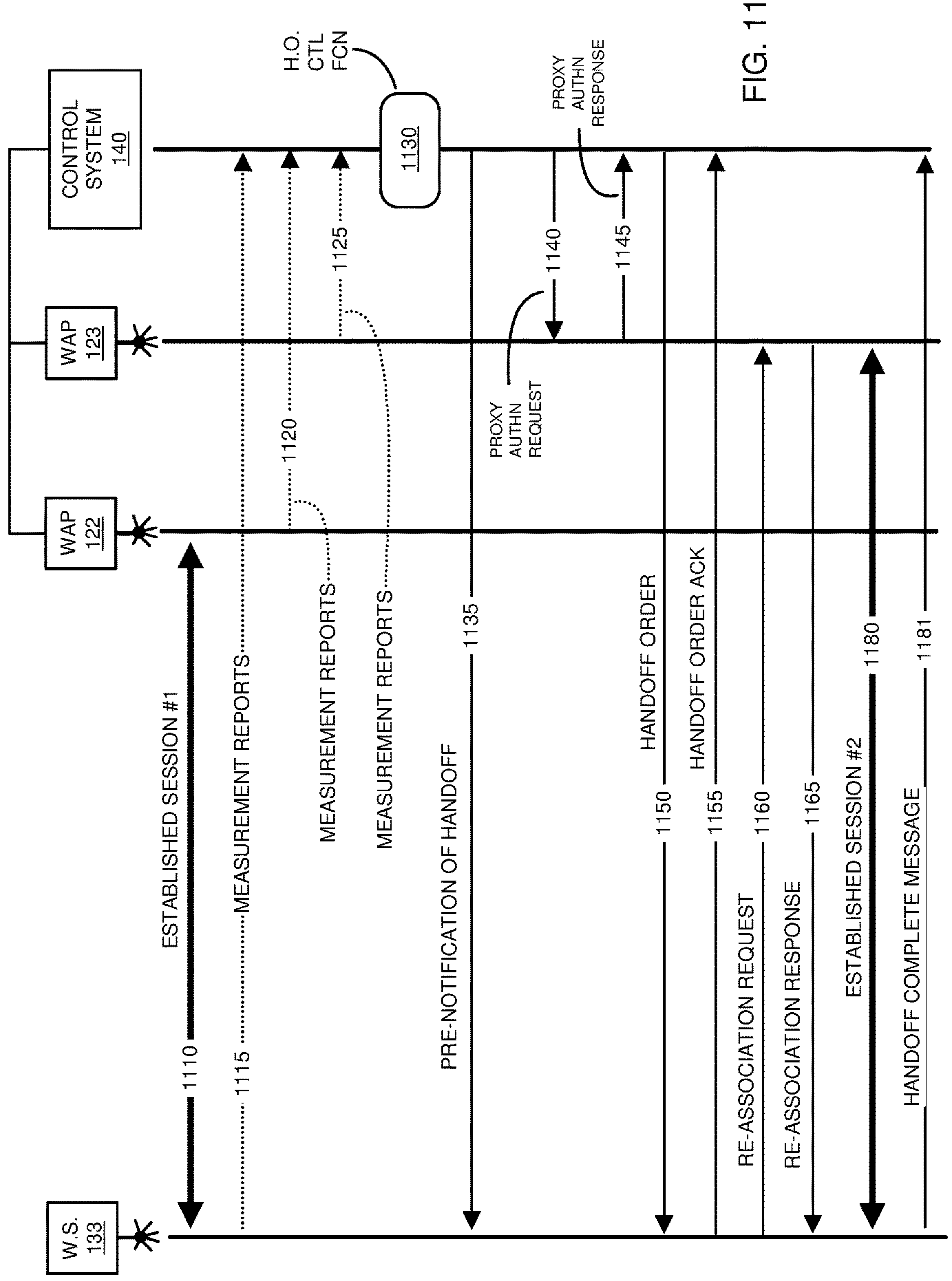

FIG. 11 is an example diagram illustrating a handoff according to embodiments herein.

In this example embodiment, the wireless station 13X is one of wireless station 131, wireless station 132, wireless station 133, etc., as previously discussed. The wireless station may be mobile or stationary in the wireless network environment 100.

Further, as previously discussed, movement of a respective one or more wireless station in the wireless network environment 100 causes the current wireless link between the respective wireless station and a first wireless access point to degrade, causing the control system 140 to initiate a handoff of the respective wireless station 13X to a second wireless access point based on ranking information generated for the respective wireless station.

As further shown in this example embodiment, via communications 1110, the wireless station 133 is initially in communication with the wireless access point 122 via a respective established session #1 (such as wireless communication link). Thus, the communication device (such as wireless station 133 and corresponding remote device 183) is in communication with wireless access point 122 over a respective wireless link.

The control system 140 (i.e., communication management resource) receives and analyzes performance information indicating wireless connectivity performance between the wireless station and a set of candidate wireless access points including wireless access point 123.

More specifically, the wireless station 13X analyzes a power level or quality of wireless communications (such as downlink) received from the wireless access point 122; the wireless station 13X analyzes a power level or quality of wireless communications received from the wireless access point 123; and so on.

Via communications 1115, the wireless station 13X reports the performance information (such as power level of received wireless communications, link quality, etc.) regarding received wireless communications through wireless access point 122 to the control system 140.

The wireless access point 122 analyzes a power level or quality of wireless communications received from the wireless station 13X in the uplink direction. Via communications 1020, the wireless access point 122 reports the performance information (such as power level of received wireless communications, link quality, etc., associated with wireless communications received from the wireless station 13X) to the control system 140.

The wireless access point 123 analyzes a power level or quality of wireless communications received from the wireless station 13X in the uplink direction. Via communications 1025, the wireless access point 123 reports the performance information (such as power level of received wireless communications, link quality, etc., associated with wireless communications received from the wireless station 13X) to the control system 140.

Thus, the control system 140 receives first performance information originating from the wireless station 13X; the first performance information indicates performance of the wireless station 13X receiving communications from the first wireless access point 122 and the wireless access point 123.

The control system 140 receives second performance information originating from the first wireless access point 122; the second performance information indicates performance of the first wireless access point 122 receiving second wireless communications from the wireless station 13X.

The control system 140 receives third performance information originating from the candidate wireless access point 123; the third performance information indicates performance of the candidate wireless access point 123 receiving third wireless communications from the wireless station 13X.

Based on analysis of the performance information via handoff control function 1030 associated with control system 140 or other suitable entity, the control system 140 generates respective ranking information as previously discussed and selects a candidate wireless access point from the set of candidate wireless access points including wireless access points 122 and 123.

Assume in this example embodiment that, based on received performance information, the communication system 140 detects that the link quality between the wireless station 13X and wireless access point 122 is poor and that the wireless access point 123 would provide much better wireless connectivity to the wireless station 13X. In such an instance, the handoff control function 1130 notifies the wireless station 13X and corresponding remote device to handoff its current wireless link from the wireless access point 122 to the selected candidate wireless access point 123.

As previously discussed, in one embodiment, each of the first wireless access point 122 and the selected candidate wireless access point 123 provide the wireless station 13X (communication device) connectivity to the control system 140 (such as a controller resource or communication management hardware) that controls operation and wireless connectivity of the remote device. The initiated handoff of the wireless station 13X from the first wireless access point 122 to the second wireless access point 123 ensures continued connectivity of the wireless station 13X to the control system 140.

As further shown in FIG. 11, in response to making a respective decision to perform a handoff from the wireless access point 122 to the wireless access point 123, the control system 140 (a.k.a., communication management hardware) communicates a first notification (pre-notification of a handoff order or command) such as via communications 1135 from the control system 140 to the wireless station 13X. The first notification indicates a decision to handoff the wireless link from the first wireless access point 122 to the second wireless access point 123.

Further embodiments herein include, via the control system 140 and communications 1135, communicating an identity of the selected wireless access point 123 to the wireless station 13X. Accordingly, the wireless station 13X is informed of the selected wireless access point 123 in which to perform a handoff of a respective wireless link. Note that the identity of the wireless access point to receive the handoff link may be sent in the communications 1135 as well.

In still further example embodiments, the control system 140 communicates an authentication request in communications 1140 from the control system 140 to the selected wireless access point 123; the proxy authentication request in communications 1140 pre-authenticates the communication device with the selected wireless access point 123. In other words, the control system 140 initiates partial or full authentication of the wireless station 133 on behalf of the while station 133. In response to communicating the authentication request in communications 1140, the control system 140 receives an authentication response in communications 1145 from the selected wireless access point 123 resulting in partial or full authentication of the while station 133 to communicate with the wireless access point 123.

In one embodiment, the response in communications 1145 from the wireless access point 123 to the control system 140 includes security information (such as results of pre-authenticating the wireless station 13X with the selected wireless access point 123) facilitating secured connectivity of the wireless station 13X with the selected wireless access point 123.

Additionally, in response to the handoff control function 1130 deciding to performance a handoff, the control system 140 communicates a second notification in communications 1150 from the control system 140 to the wireless station 13X. In one embodiment, the second notification indicates results of pre-authenticating the wireless station with the selected wireless access point 123 via communications 1140 and 1145.

In one embodiment, as a response to communicating the handoff command to the wireless station 13X in communications 1150, the control system 140 receives an acknowledgement message (such as a Handoff Order Acknowledgment in communications 1155) from the wireless station 13X. In one embodiment, the acknowledgement message as indicated by the communications 1155 confirms that the wireless station 13X has received the handoff message in communications 1150 indicating/including the final instruction to handoff the communication link from the first wireless access point 122 to the selected candidate wireless access point 123. In one embodiment, the communications 1155 notify the control system that the wireless station 13X will initiate a respective handoff as indicated by the handoff command in communications 1150.

In one embodiment, the handoff notification in communications 1150 to the wireless station 13X causes a so-called fast transfer (such as in accordance with standard 802.11 or a Wi-Fi™ protocol) of the wireless station 13X from the wireless access point 122 to the selected candidate wireless access point 123.

As previously discussed, poor communication link between the wireless station 13X and the wireless access point 122 can occur for any reason. In one embodiment, the control system 140 generates communications 1135, 1140, 1145, 1150, etc., in response to detecting that a remote device or object in the wireless network environment 100 blocks wireless signals between the wireless station 13X and the wireless access point 122.

As previously discussed, determining that wireless connectivity is poor between the wireless station 13X and the wireless access point can be detected in any suitable manner. For example, in one embodiment, the control system 140 monitors anticipated motion of objects such as a second communication device along paths of network environment. In one embodiment, the control system 140 notifies the wireless station 13X to handoff a respective wireless link from the first wireless access point 122 to the selected candidate wireless access point 123 in response to detecting the anticipated motion of the second communication device blocking wireless signals between the wireless station 13X and the first wireless access point 122 at a particular time. As further shown, in response to receiving the handoff command via communications 1150, the wireless station 13X sends a request in communications 1160 to the wireless access point 123 to establish a respective wireless link. In one embodiment, the communications 1060 include a re-association request.

In response to receiving the re-association request in communications 1160, the wireless access point 123 generates and transmits a respective association response in communications 1165 to the wireless station 13X.

In one embodiment, as previously discussed, the communications 1140 and 1145 include setting up encryption capability between the wireless station 13X and the wireless access point 123. Note that, in certain instances, complete setup of a secured communication link and/or authentication between the wireless station and the wireless access point 123 may not be possible via communications 1140 and 1145 alone. In such an instance, additional security (encryption) setup is needed between wireless station 13X and the wireless access point 123. In one embodiment, additional communications (such as via communications 1160 and 1165) between the wireless station 13X and the wireless access point 123 after communications 1155 and before communications 1180 include completing setup of encryption capability between the wireless station 13X and the wireless access point 123.

Via further communications 1180, after completion of the handoff and setting up a respective secured wireless communication link between the wireless station 13X and the wireless access point 123, the wireless station 13X and the wireless access point 123 are able to communicate with each other over a respective secured wireless communication link via session #2.

In one embodiment, subsequent to establishing the new session #2 between the wireless station 133 and the wireless access point 123, the wireless station 13X communicates a handoff complete message (such as communication 1181) to the control system 140. The handoff complete message indicates completion of handing off of the wireless station 13X (or wireless station 133) from wireless access point 122 to wireless access point 123. The control system 140 keeps track of the new connectivity between the wireless station 133 and the wireless access point 123.

Summary of Methods and Procedures

B. MEC Assisted Fast Transition (FT) [See Diagram 2]. This Further Enhances the Performance by Having the MEC System Act as a Proxy for the STA and Requiring the STA to Only Perform the Reassociation Procedure.

1. Access points (APs) and stations (STAs) each measure radio link metrics and send measurement reports to the MEC system.
2. The MEC system monitors all of the radio link metrics and determines when an FT trigger is needed for those STAs that require them. This could be due to the STA being mobile and moving from one AP coverage zone to another, or it could be due to moving objects within the deployment environment that have blocked the radio link and a new radio connection is required to maintain quality of service (QoS) [see FIG. 2]
3. When the MEC system determines an FT is required for an STA it acts as a proxy for the STA and performs the Authentication procedure on behalf of the STA.
4. When the Authentication procedure is complete the MEC issues an FT Order message to the STA with the Target AP and new security credentials.
5. The STA acknowledges the FT Order and performs the Reassociation procedure with the Target AP using the security credentials supplied by the MEC.
6. Upon completion of the Reassociation procedure the STA receives service through a newly established session on the Target AP.

Figure 12:
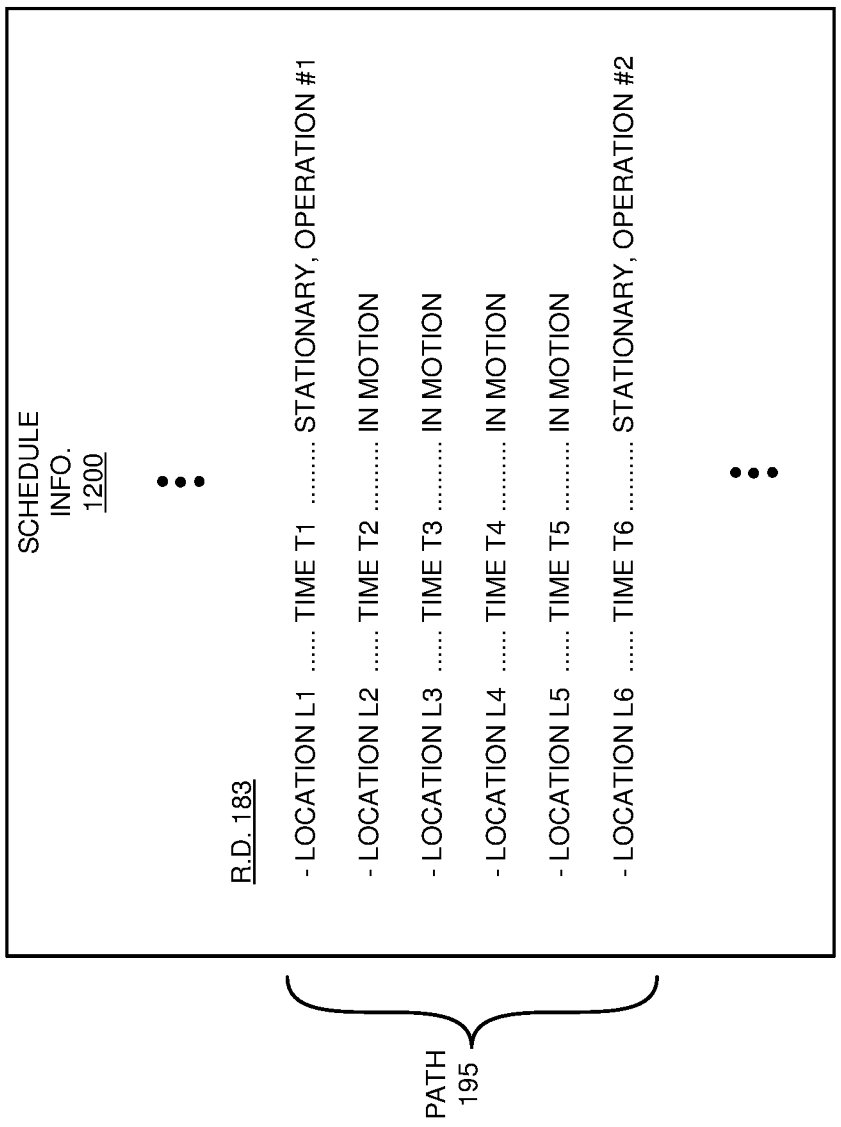
FIG. 12 is an example diagram illustrating schedule information of multiple remote devices at different times according to embodiments herein.

FIG. 12 is an example diagram illustrating location schedule information of a remote device at different times according to embodiments herein.

In this example embodiment, the control system 140 has knowledge of a scheduled movement of each of the remote devices in the network environment 100. For example, as shown, the control system 140 determines that the remote device 183 will be at location L1 performing operation #1 at time T1; the control system 140 determines that the remote device 183 will be in motion at location L2 at time T2; the control system 140 determines that the remote device 183 will be in motion at location L3 at time T3; the control system 140 determines that the remote device 183 will be in motion at location L4 at time T4; the control system 140 determines that the remote device 183 will be in motion at location L5 at time T5; the control system 140 determines that the remote device 183 will be at location L6 at time T6.

In one embodiment, the control system 140 has access to schedule information 1200 for each of the remote devices in network environment 100. In such an instance, based on the schedule information 1200, and potentially in lieu of using the performance measurement reports from multiple wireless station and wireless access points, the control system 140 determines when to perform handoffs of the wireless communication links based on anticipation of wireless communications being blocked by the controlled motion of the remote device 183.

For example, in one embodiment, in anticipation of the remote device 183 being at the location L2 at time T2, the control system 140 initiates the handoffs and wireless connectivity at around time T2 as indicated by FIG. 2 and corresponding text; in anticipation of the remote device 183 being at the location L3 at time T3, the control system 140 initiates the handoffs and wireless connectivity at or around time T3 as indicated by FIG. 3 and corresponding text; in anticipation of the remote device 183 being at the location L4 at time T4, the control system 140 initiates the handoffs and wireless connectivity at or around time T4 as indicated by FIG. 4 and corresponding text; in anticipation of the remote device 183 being at the location L5 at time T5, the control system 140 initiates the handoffs and wireless connectivity at or around time T5 as indicated by FIG. 5 and corresponding text; in anticipation of the remote device 183 being at the location L6 at time T6, the control system 140 initiates the handoffs and wireless connectivity at or around time T6 as indicated by FIG. 6 and corresponding text; and so on.

Figure 13:
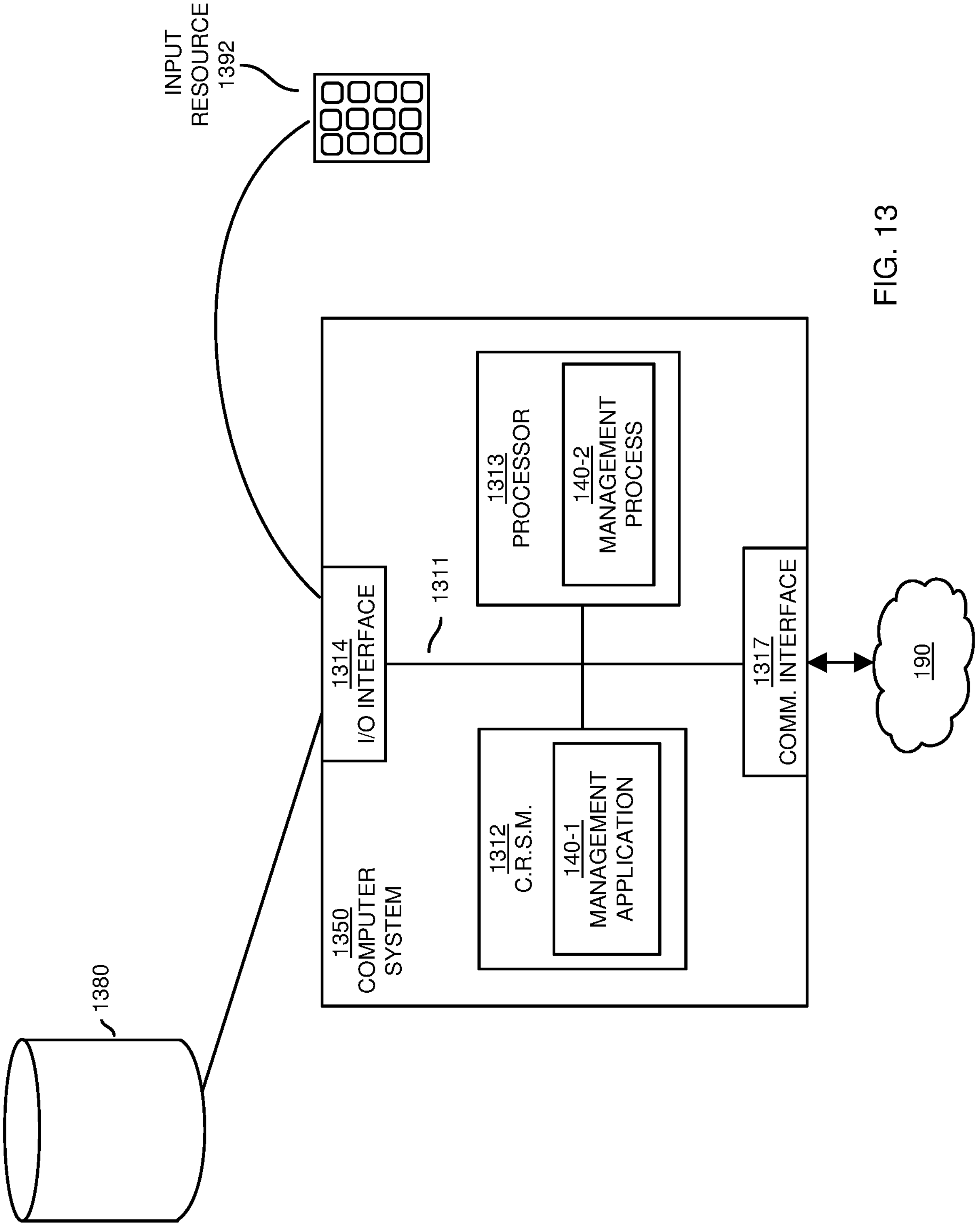
FIG. 13 is a diagram illustrating example computer architecture to execute one or more operations according to embodiments herein.

FIG. 13 is an example block diagram of a computer system for implementing any of the operations as discussed herein according to embodiments herein.

As previously discussed, any of the resources (such as wireless station 131, wireless station 132, wireless access point 121, wireless access point 122, control system 140, etc.) as discussed herein can be configured to include computer processor hardware and corresponding executable instructions to carry out the different operations as discussed herein.

As shown, computer system 1350 of the present example can include an interconnect 1311 that couples computer readable storage media 1312 such as a non-transitory type of media (such as a type of hardware storage medium) in which digital information can be stored and retrieved, a processor 1313, I/O interface 1314, and a communications interface 1317.

I/O interface 1314 supports connectivity to repository 1380 and input resource 1392.

Computer readable storage medium 1312 can be any hardware storage device such as memory, optical storage, hard drive, floppy disk, etc. In one embodiment, the computer readable storage medium 1312 stores instructions and/or data.

As shown, computer readable storage media 1312 can be encoded with management application 140-1 (e.g., including instructions) to carry out any of the operations as discussed herein. As previously discussed, the management application 140-1 can be configured to implement any of the operations as described herein such as those provided by communication management resource 142, communication management resource 141, etc.

During operation of one embodiment, processor 1313 accesses computer readable storage media 1312 via the use of interconnect 1311 in order to launch, run, execute, interpret or otherwise perform the instructions in management application 140-1 stored on computer readable storage medium 1312. Execution of the management application 140-1 produces management process 140-2 to carry out any of the operations and/or processes as discussed herein.

Those skilled in the art will understand that the computer system 1350 can include other processes and/or software and hardware components, such as an operating system that controls allocation and use of hardware resources to management application 140-1.

In accordance with different embodiments, note that computer system may be or included in any of various types of devices, including, but not limited to, a mobile computer, user equipment, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1350 may reside at any location or can be included in any suitable resource in any network environment to implement functionality as discussed herein.

Functionality supported by the different resources as described herein will now be discussed via the method flowchart in FIGS. 14 and 15. Note that the steps in the flowcharts below can be executed in any suitable order.

Figure 14:
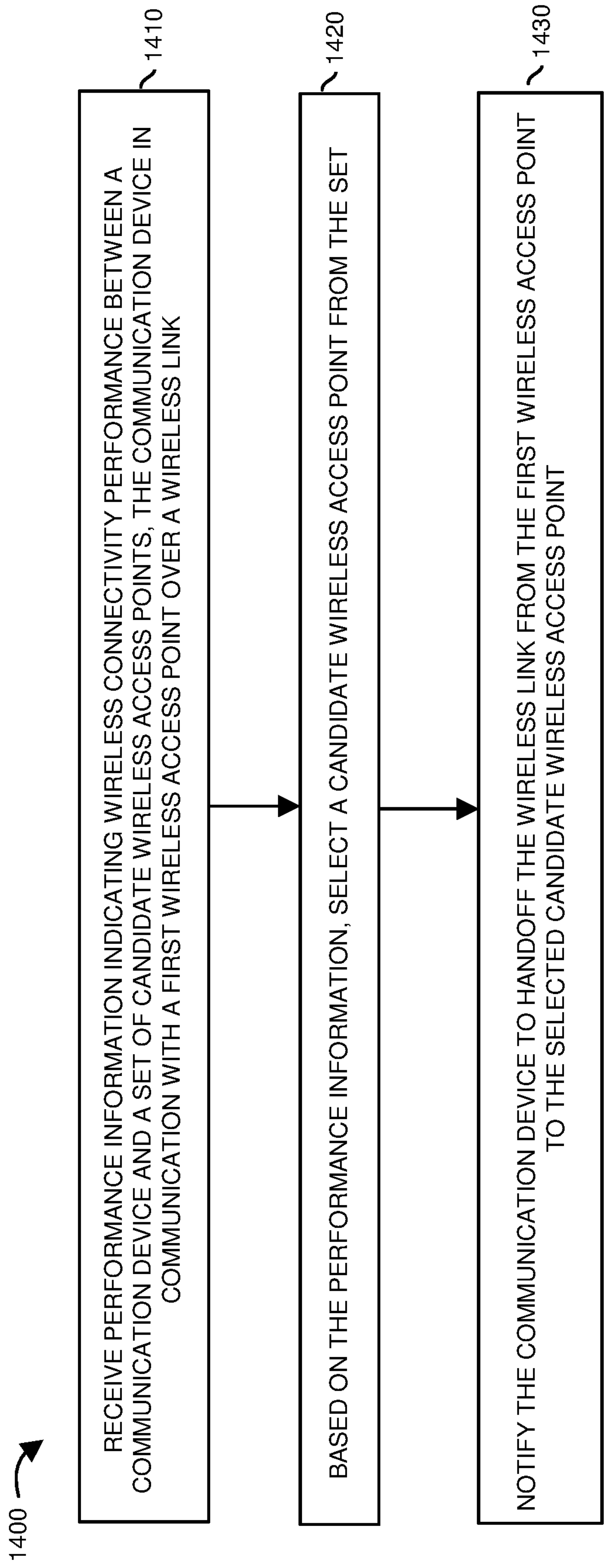
FIG. 14 is an example diagram illustrating a method according to embodiments herein.

FIG. 14 is a flowchart 1400 illustrating an example method according to embodiments. Note that there will be some overlap with respect to concepts as discussed above.

In processing operation 1410, the controller 140 receives performance information indicating wireless connectivity performance between a communication device and a set of candidate wireless access points, the communication device in communication with a first wireless access point over a wireless link.

In processing operation 1420, based on the performance information, the controller selects a candidate wireless access point from the set.

In processing operation 1430, the controller notifies the communication device to handoff the wireless link from the first wireless access point to the selected candidate wireless access point.

Figure 15:
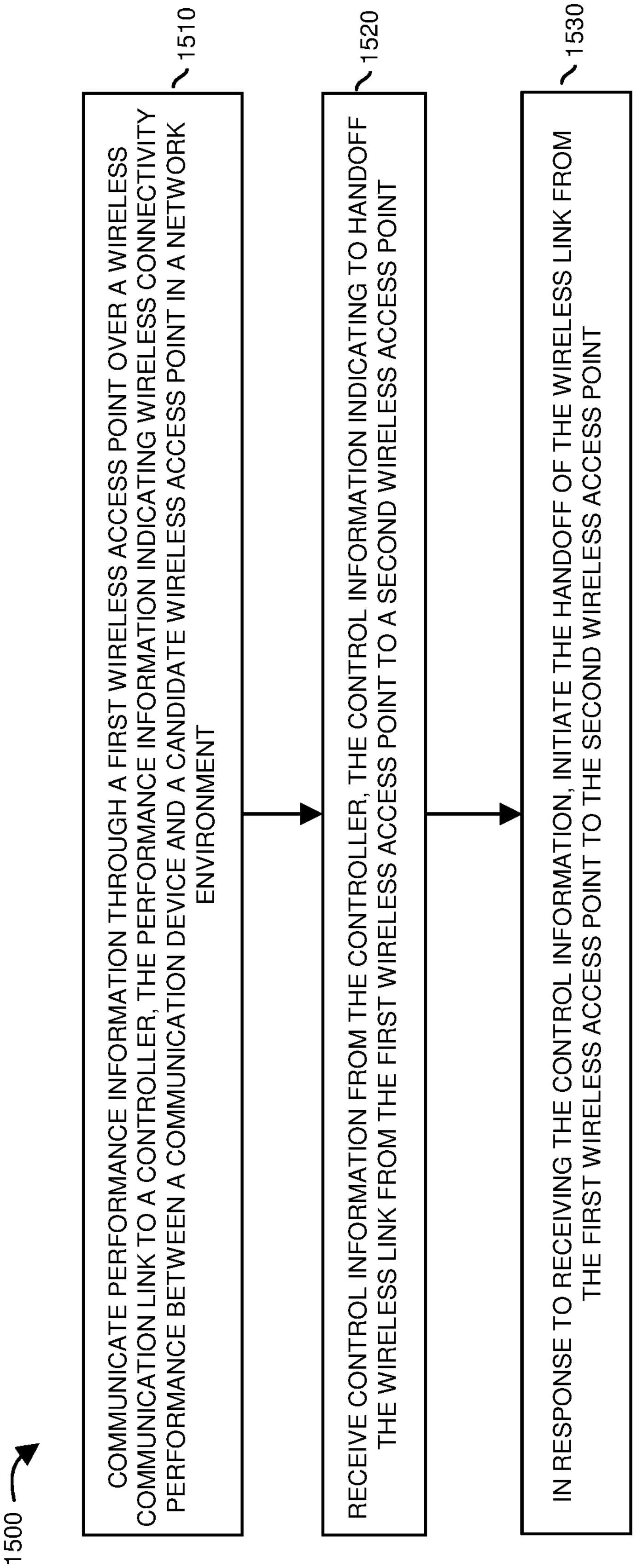
FIG. 15 is an example diagram illustrating a method according to embodiments herein.

FIG. 15 is a flowchart 1500 illustrating an example method according to embodiments. Note that there will be some overlap with respect to concepts as discussed above.

In processing operation 1510, the communication device communicates performance information through a first wireless access point over a wireless communication link to a controller; the performance information indicating wireless connectivity performance between a communication device and a candidate wireless access point in a network environment.

In processing operation 1520, the communication device receives control information from the controller. The control information indicating to handoff the wireless link from the first wireless access point to a second wireless access point.

In processing operation 1530, in response to receiving the control information, communication device initiates the handoff of the wireless link from the first wireless access point to the second wireless access point.

Note again that techniques herein are well suited to facilitate controlling wireless connectivity in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A method comprising:

communicating performance information over a first wireless communication link and through a first wireless access point to a controller, the performance information indicating wireless connectivity performance between a first communication device and a second wireless access point;

receiving control information from the controller, the control information indicating to handoff the first communication device from the first wireless access point to the second wireless access point;

in response to receiving the control information, and as indicated by the control information, initiating the handoff of the first communication device from the first wireless access point to the second wireless access point; and wherein the control information includes results of the controller pre-authenticating the first communication device to communicate with the second wireless access point after the handoff.

2. The method as in claim 1, wherein the controller is operative to produce the control information based on the performance information.

3. The method as in claim 2 further comprising:

in response to receiving the control information at the first communication device, communicating an acknowledgement from the first communication device through the first wireless access point to the controller.

4. The method as in claim 2, wherein receiving the control information includes: receiving an identity of the second wireless access point.

5. The method as in claim 4 further comprising:

as a response to receiving the identity of the second wireless access point, communicating an acknowledgement message from the first communication device to the controller, the acknowledgement message confirming receipt of notification of the handoff from the first wireless access point to the second wireless access point.

6. The method as in claim 1, wherein the pre-authenticating of the first communication device with the second wireless access point alleviates a need for the first communication device to perform authentication of the first communication device with the second wireless access point during the handoff.

7. The method as in claim 1, wherein the results of the controller pre-authenticating the first communication device include security information, the method further comprising:

at the first communication device, in furtherance of the handoff, utilizing the security information to establish a second wireless communication link between the first communication device and the second wireless access point, the security information supporting encrypted communications between the first communication device and the second wireless access point.

8. The method as in claim 1, wherein the controller is operative to derive a ranking of the first wireless access point and the second wireless access point based on the performance information.

9. The method as in claim 1 further comprising:

communicating a notification to the controller, the notification indicating the handoff of the first communication device from the first wireless access point to the second wireless access point.

10. The method as in claim 1, wherein the results of the controller pre-authenticating the communication device include security information, the security information used by the communication device to establish a secured wireless communication link supporting conveyance of encrypted communications between the first communication device and the second wireless access point over a second wireless communication link.

11. The method as in claim 1, wherein the control information indicates to initiate the handoff of the first communication device from the first wireless access point to the second wireless access point at a specified time; and wherein the specified time is determined based on an anticipated time of future wireless communications over the first wireless communication link between the first communication device and the first wireless access point being blocked.

12. The method as in claim 11, wherein the anticipated time of the future wireless communications being blocked is based upon a schedule of an entity conveying a second communication device being present at different locations along a travel path at different times; and wherein the entity is anticipated to block wireless signals between the first wireless access point and the first communication device at the specified time.

13. The method as in claim 1, wherein the first wireless communication link supports first wireless communications between the first communication device and the first wireless access point prior to the handoff; and wherein the first communication device is pre-authenticated to use the second wireless access point in response to anticipation of the first wireless communications over the first wireless communication link between the first communication device and the first wireless access point being blocked at a particular time.

14. The method as in claim 13, wherein the particular time is determined based at least in part on schedule information indicating timing of an entity traveling along a path passing between the first wireless access point and the first communication device, the entity anticipated to block the first wireless communication link at the particular time based on the schedule information.

15. The method as in claim 14, wherein the entity conveys a second communication device, the second communication device in wireless communication with the first wireless access point over a second wireless communication link.

16. The method as in claim 15, wherein the second communication device remains in communication over the second wireless communication link with the first wireless access point at the particular time in which the first communication device has already handed off from the first wireless access point to the second wireless access point.

17. The method as in claim 14, wherein initiating the handoff of the first communication device from the first wireless access point to the second wireless access point includes:

at the particular time, transmitting a message from the first communication device to the second wireless access point, the message including a request to establish a third wireless communication link between the first communication device and the second wireless access point.

18. The method as in claim 1, further comprising:

based on schedule information, monitoring anticipated movement of an entity through a wireless network environment including the first communication device and the first wireless access point; and based on the anticipated movement of the entity to a location between the first communication device and the first wireless access point as indicated by the schedule information, initiating the handoff of the first communication device from the first wireless access point to the second wireless access point.

19. The method as in claim 18, wherein initiating the handoff of the first wireless station from the first wireless access point to the second wireless access point includes communicating a handoff command from the first wireless access point to the first communication device prior to the entity being present at the location between the first wireless access point and the first communication device.

20. A system comprising:

a communication device operative to:

communicate performance information over a first wireless communication link and through a first wireless access point to a controller, the performance information indicating wireless connectivity performance between a communication device and a second wireless access point;

receive control information from the controller, the control information indicating to handoff the communication device from the first wireless access point to the second wireless access point; and in response to receiving the control information, initiate the handoff of the communication device from the first wireless access point to the second wireless access point; and wherein the control information includes results of the controller pre-authenticating the communication device to communicate with the second wireless access point.

21. The system as in claim 20, wherein the pre-authentication of the communication device with the second wireless access point alleviates a need for the communication device to perform authentication of the communication device with the second wireless access point.

22. The system as in claim 20, wherein the results of the controller pre-authenticating the communication device includes security information, wherein the communication device is further operative to:

at the communication device, in furtherance of the handoff, utilize the security information to establish a second wireless communication link between the communication device and the second wireless access point.

23. The system as in claim 20, wherein the controller is operative to derive a ranking of the first wireless access point and the second wireless access point based on the performance information.

24. The system as in claim 20, wherein the communication device is further operative to:

communicate a notification to the controller, the notification indicating completion of the handoff of the communication device from the first wireless access point to the second wireless access point.

25. Computer-readable storage hardware having instructions stored thereon, the instructions, when executed by computer processor hardware, cause the computer processor hardware to:

communicate performance information over a first wireless communication link through a first wireless access point to a controller, the performance information indicating wireless connectivity performance between a communication device and a second wireless access point;

receive control information from the controller, the control information indicating to handoff the communication device from the first wireless access point to the second wireless access point;

in response to receiving the control information, initiate the handoff of the communication device from the first wireless access point to the second wireless access point; and wherein the control information includes results of the controller pre-authenticating the communication device with the second wireless access point.

* * * * *